United States Patent
Xu

(10) Patent No.: US 11,553,078 B2
(45) Date of Patent: Jan. 10, 2023

(54) TOUCHSCREEN RESPONSE METHOD AND ELECTRONIC DEVICE

(71) Applicant: Huawei Technologies Co., Ltd., Shenzhen (CN)

(72) Inventor: Jie Xu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/312,791

(22) PCT Filed: Nov. 30, 2019

(86) PCT No.: PCT/CN2019/122250
§ 371 (c)(1),
(2) Date: Jun. 10, 2021

(87) PCT Pub. No.: WO2020/119493
PCT Pub. Date: Jun. 18, 2020

(65) Prior Publication Data
US 2022/0053080 A1     Feb. 17, 2022

(30) Foreign Application Priority Data
Dec. 11, 2018   (CN) .................. 201811513765.X

(51) Int. Cl.
*H04M 1/72454*   (2021.01)
*G06F 3/041*   (2006.01)
(Continued)

(52) U.S. Cl.
CPC ...... *H04M 1/72454* (2021.01); *G06F 3/0412* (2013.01); *G06F 3/0488* (2013.01); *H04M 1/0268* (2013.01); *G06F 2203/04105* (2013.01)

(58) Field of Classification Search
CPC .... G06F 1/1694; G06F 1/1652; G06F 3/0488; G06F 3/0412; G06F 3/04883;
(Continued)

(56) References Cited

U.S. PATENT DOCUMENTS

2010/0149130 A1   6/2010  Jung et al.
2013/0194176 A1*  8/2013  Chung .................. G06F 1/1684
                                          345/156
(Continued)

FOREIGN PATENT DOCUMENTS

CN    103218163 A    7/2013
CN    104636003 A    5/2015
(Continued)

OTHER PUBLICATIONS

English Translation for CN108111689A, Apr. 4, 2022, pp. 1-15 (Year: 2022).*
(Continued)

*Primary Examiner* — Jimmy H Nguyen
(74) *Attorney, Agent, or Firm* — Conley Rose, P.C.

(57) ABSTRACT

A method includes determining a first device status when at a first moment, determining a touch parameter of a first side area of the curved screen of the electronic device as a first response threshold based on the first device status, where a pressure sensor is disposed in the first side area of the curved screen, receiving a first operation, responding to the first operation when the first operation meets the first response threshold, determining a second device status at a second moment, adjusting the touch parameter from the first response threshold to a second response threshold based on the second device status, receiving a second operation of the user in the first side area of the curved screen, and responding to the second operation when a pressure threshold of the second operation meets the second response threshold.

15 Claims, 14 Drawing Sheets

(51) Int. Cl.
*G06F 3/0488* (2022.01)
*H04M 1/02* (2006.01)

(58) Field of Classification Search
CPC .......... G06F 3/0346; G06F 2203/0339; G06F 2203/041; G06F 2200/1637; G06F 2200/1614; H04M 1/72454; H04M 1/0268
USPC ................................................ 345/173, 158
See application file for complete search history.

(56) References Cited

U.S. PATENT DOCUMENTS

| | | | |
|---|---|---|---|
| 2018/0157411 | A1 | 6/2018 | Kim et al. |
| 2020/0168182 | A1* | 5/2020 | Ebihara ............... H04M 1/0202 |

FOREIGN PATENT DOCUMENTS

| | | | |
|---|---|---|---|
| CN | 105468153 | A | 4/2016 |
| CN | 106293199 | A | 1/2017 |
| CN | 107562324 | A | 1/2018 |
| CN | 207037545 | U | 2/2018 |
| CN | 108062180 | A | 5/2018 |
| CN | 108111689 | A | 6/2018 |
| CN | 108287611 | A | 7/2018 |
| CN | 108471471 | A | 8/2018 |
| CN | 108595089 | A | 9/2018 |
| CN | 109782944 | A | 5/2019 |
| JP | 2013137697 | A | 7/2013 |
| WO | 2013135970 | A1 | 9/2013 |
| WO | 2016065482 | A1 | 5/2016 |
| WO | WO-2019017153 | A1 * | 1/2019 ............. G06F 3/033 |

OTHER PUBLICATIONS

English Translation for CN207037545U, Apr. 4, 2022, pp. 1-4 (Year: 2022).*

English Translation for CN103218163A, Apr. 4, 2022, pp. 1-7 (Year: 2022).*

English Translation for CN106293199A, Apr. 4, 2022, pp. 1-10 (Year: 2022).*

* cited by examiner

TOUCHSCREEN RESPONSE METHOD AND ELECTRONIC DEVICE

CROSS-REFERENCE TO RELATED APPLICATIONS

This application is a U.S. National Stage of International Patent Application No. PCT/CN2019/122250 filed on Nov. 30, 2019, which claims priority to Chinese Patent Application No. 201811513765.X filed on Dec. 11, 2018. Both of the aforementioned applications are hereby incorporated by reference in their entireties.

TECHNICAL FIELD

This application relates to the field of terminal technologies, and in particular, to a touchscreen response method and an electronic device.

BACKGROUND

Touchscreens are widely applied to electronic products such as a mobile phone, an ebook, and a digital camera, to facilitate a user operation. Existing touchscreens include a capacitive touchscreen and a resistive touchscreen. A commonly used capacitive touchscreen uses current induction of a human body to work. Generally, the capacitive touchscreen is a four-layer compound glass screen. An inner surface and an interlayer of the glass screen are each coated with one layer of ITO (coated conductive glass), and an outermost layer is a thin protective layer of silica glass. An ITO-coated layer is used as a working surface, four electrodes are led out from four corners, and an inner ITO layer is used as a shield layer to ensure a good working environment. When a finger of a user touches the capacitive touchscreen, because of an electric field of a human body, the finger of the user and a surface of the capacitive touchscreen form a coupling capacitor (for a high-frequency current, the capacitor may be considered as a conductor). The finger of the user sucks a small current from a touch point on the surface of the capacitive touchscreen, and the current separately flows from the electrodes at the four corners of the capacitive touchscreen. Because the current flowing through each of the four electrodes is in direct proportion to a distance between the finger and each of the four corners, a controller may obtain a location of the touch point and respond accordingly by accurately calculating four current proportions.

With updating and upgrading of electronic products, screen sizes of touchscreens on some electronic products are getting larger, resulting in a higher probability of misoperations in an operation process. In a handheld operation state, when the finger of the user touches the touchscreen, misoperations frequently occur. With development of bendable screen and side sensor technologies, more touch operations may be performed on a side surface of a mobile phone. In addition to conventional operation areas of a power button and a volume button, there may be more other operation areas, and a new operation area brings a new feature function. This brings more convenience to the user. However, because the side is a location at which a palm of the user holds the mobile phone, if a new touch operation is added in this area, a risk of misoperations greatly increases in a process in which the user holds the mobile phone. Once misoperations occur frequently, experience is greatly affected. Therefore, it is very important to prevent a misoperation during side interaction.

SUMMARY

This application provides a touchscreen response method and an electronic device, to filter a misoperation of a user, thereby reducing a probability of misoperations on a curved screen in a side area.

According to a first aspect, an embodiment of this application provides a touchscreen response method, and the method is applied to an electronic device having a curved screen. The method includes: first determining a first device status when the electronic device is held by a user at a first moment, and determining a touch parameter of a first side area of the curved screen of the electronic device as a first response threshold based on the first device status, where a pressure sensor is disposed in the first side area of the curved screen of the electronic device; then receiving a first operation of the user in the first side area of the curved screen; responding to the first operation when it is determined that the first operation meets the first response threshold; determining a second device status when the electronic device is held by the user at a second moment, and adjusting the touch parameter of the first side area of the curved screen of the electronic device from the first response threshold to a second response threshold based on the second device status, where a value of the first response threshold is different from a value of the second response threshold; receiving a second operation of the user in the first side area of the curved screen; and responding to the second operation when it is determined that a pressure threshold of the second operation meets the second response threshold.

In this embodiment of this application, the electronic device may filter a misoperation of the user by using the foregoing method, to reduce a probability of misoperations on the curved screen in a side area.

In a possible design, when the touch parameter is pressure, the first operation and the second operation are pressing operations, the first response threshold is first pressure, and the second response threshold is second pressure. That is, when receiving a first pressing operation of the user, the electronic device determines whether the pressing operation is greater than the first pressure, and responds to the first pressing operation. When the electronic device changes from the first device status to the second device status, the touch parameter of the first side area of the curved screen of the electronic device is adjusted from the first pressure to the second pressure. Then, the electronic device responds to a second pressing operation when determining that the pressure threshold of the second operation is greater than the second pressure.

In a possible design, when the touch parameter is pressure and a sliding distance, the first operation and the second operation are pressing and sliding operations, the first response threshold is first pressure and a first sliding distance, and the second response threshold is second pressure and a second sliding distance. That is, when receiving a first pressing and sliding operation of the user, the electronic device determines whether the pressing operation is greater than the first pressure and a sliding distance is greater than the first sliding distance, and responds to the first pressing operation. When the electronic device changes from the first device status to the second device status, the touch parameter of the first side area of the curved screen of the electronic device is adjusted from the first pressure to the second pressure. Then, the electronic device responds to a second pressing operation when determining that the pressure threshold of the second operation is greater than the second pressure and a sliding distance is greater than the second sliding distance.

In a possible design, if the first device status is a still state, and the second device status is a motion state, the touch parameter is pressure and an interface response time, the first response threshold is first pressure and a first response time, the second response threshold is second pressure and a second response time, the first response time is less than the second response time, and the first operation and the second operation are pressing operations. That is, if the electronic device is in the still state, when receiving a first pressing operation of the user and determining whether the pressing operation is greater than the first pressure, the electronic device immediately responds to the first pressing operation. When the electronic device changes from the still state to the motion state, the touch parameter of the first side area of the curved screen of the electronic device is adjusted from the first pressure to the second pressure. Then, when determining that the pressure threshold of the second operation is greater than the second pressure, the electronic device responds to a second pressing operation at a delay of a specified time.

In this embodiment of this application, a screen response time is increased to avoid a misoperation caused by an excessively large motion amplitude of the user in a motion process.

In a possible design, the electronic device may adjust a response threshold of an entire side from the first response threshold to the second response threshold, or may adjust an area in which a virtual button on the side is located from the first response threshold to the second response threshold.

According to a second aspect, an embodiment of this application provides a touchscreen response method. The method includes: An electronic device determines, based on status data that is collected by a gyroscope sensor and a gravity sensor when an electronic device is held by a user at a first moment, that the electronic device is in a portrait state at the first moment, and determines, based on the portrait state, that a virtual volume button of the electronic device is located in a first touch operation area; and when determining that a first operation received by a curved screen acts on the first touch operation area, the electronic device responds when the first operation meets a specified condition.

In addition, the electronic device determines, based on status data that is collected by the gyroscope sensor and the gravity sensor when the electronic device is held by the user at a second moment, that the electronic device is in a landscape state at the second moment, and adjusts, based on the landscape state, the virtual volume button of the electronic device from the first touch operation area to a second touch operation area, where a location of the second touch operation area is different from that of the first touch operation area; and when determining that a second operation received by the curved screen acts on the second touch operation area, the electronic device responds when the second operation meets a specified condition.

In this embodiment of this application, the electronic device may automatically adjust, based on the landscape state and the portrait state of the device, a location of the virtual volume button, to avoid a misoperation of the user.

According to a third aspect, an embodiment of this application provides an electronic device, including a processor and a memory. The memory is configured to store one or more computer programs. When the one or more computer programs stored in the memory are executed by the processor, the electronic device is enabled to implement the method in any possible design in any one of the foregoing aspects.

According to a fourth aspect, an embodiment of this application further provides an apparatus, and the apparatus includes a module/unit that performs the method in any possible design in any one of the foregoing aspects. These modules/units may be implemented by hardware, or may be implemented by hardware executing corresponding software.

According to a fifth aspect, an embodiment of this application further provides a computer-readable storage medium, and the computer-readable storage medium includes a computer program. When the computer program runs on an electronic device, the electronic device is enabled to perform the method in any possible design in any one of the foregoing aspects.

According to a sixth aspect, an embodiment of this application further provides a computer program product. When the computer program product runs on a terminal, the electronic device is enabled to perform the method in any possible design in any one of the foregoing aspects.

These aspects or other aspects of this application are clearer and more comprehensible in descriptions of the following embodiments.

DESCRIPTION OF EMBODIMENTS

For ease of understanding, example descriptions of some concepts related to the embodiments of this application are provided for reference. Details are shown as follows:

A curved screen is a display screen that uses flexible plastic. Compared with a bar panel screen, the curved screen has better elasticity and is not easy to break. The curved screen uses non-rigid glass as a substrate, and has better elasticity and is not easy to break. Therefore, a screen wear probability is reduced, especially for a mobile phone screen with a relatively high touch rate.

A capacitive touchscreen technology works through current induction of a human body. When a finger touches a metal layer, a user and a surface of a touchscreen form a coupling capacitor due to an electric field of the human body. For a high-frequency current, the capacitor is a direct conductor. Therefore, the finger sucks a small current from a contact point. The current separately flows from electrodes at four corners of the touchscreen, and the current flowing through each of the four electrodes is in direct proportion to a distance between the finger and each of the four corners. A processor may obtain a location of a touch point by accurately calculating four current proportions.

The following describes the technical solutions in the embodiments of this application with reference to the accompanying drawings in the embodiments of this application. The terms "first" and "second" below in the descriptions of the embodiments of this application are merely used for a description purpose, and shall not be understood as an indication or implication of relative importance or implicit indication of a quantity of indicated technical features. Therefore, a feature limited by "first" or "second" may explicitly or implicitly include one or more features.

Figure 1:
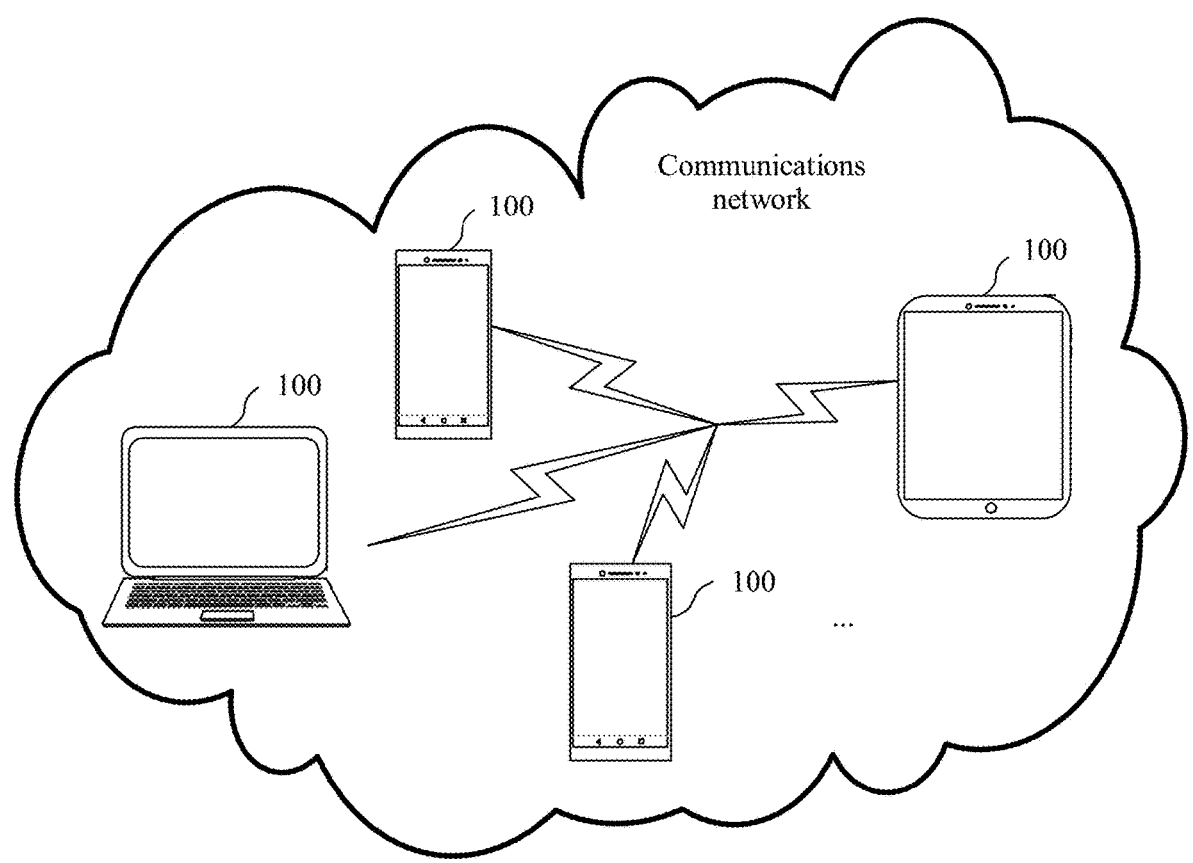
FIG. 1 is a schematic diagram of an interconnection scenario according to an embodiment of this application.

A touchscreen response method provided in the embodiments of this application may be applied to a scenario in which a plurality of electronic devices 100 shown in FIG. 1 are interconnected based on a communications network. The communications network may be a local area network, or may be a wide area network for transferring through a relay (relay) device. For example, when the communications network is a local area network, the communications network may be a short-range communications network such as a Wi-Fi hotspot network, a Wi-Fi P2P network, a Bluetooth network, a zigbee network, or a near field communication (near field communication, NFC) network. For example, when the communications network is a wide area network, the communications network may be a 3rd generation mobile communication technology (3rd-generation wireless telephone technology, 3G) network, a 4th generation mobile communication technology (the 4th generation mobile communication technology, 4G) network, a 5th generation mobile communication technology (5th-generation mobile communication technology, 5G) network, a future evolved public land mobile network (public land mobile network, PLMN), or the Internet. In the scenario shown in FIG. 1, data may be exchanged between different electronic devices by using the communications network, for example, a picture, a text, or a video is exchanged, or a result obtained after an electronic device processes an object such as a picture, a text, or a video is exchanged.

In some embodiments of this application, an electronic device 100 shown in FIG. 1 may be a portable electronic device that further includes other functions such as a personal digital assistant function and/or a music player function, for example, a mobile phone, a tablet computer, or a wearable device (for example, a smartwatch) having a wireless communication function. An example embodiment of the portable electronic device includes but is not limited to a portable electronic device using iOS®, Android®, Microsoft®, or another operating system. The portable electronic device may be alternatively another portable electronic device, for example, a laptop computer (laptop) having a touch-sensitive surface (for example, a touch panel). It should be further understood that, in some other embodiments of this application, the electronic device 100 may not be a portable electronic device, but is a desktop computer having a touch-sensitive surface (for example, a touch panel).

Figure 2:
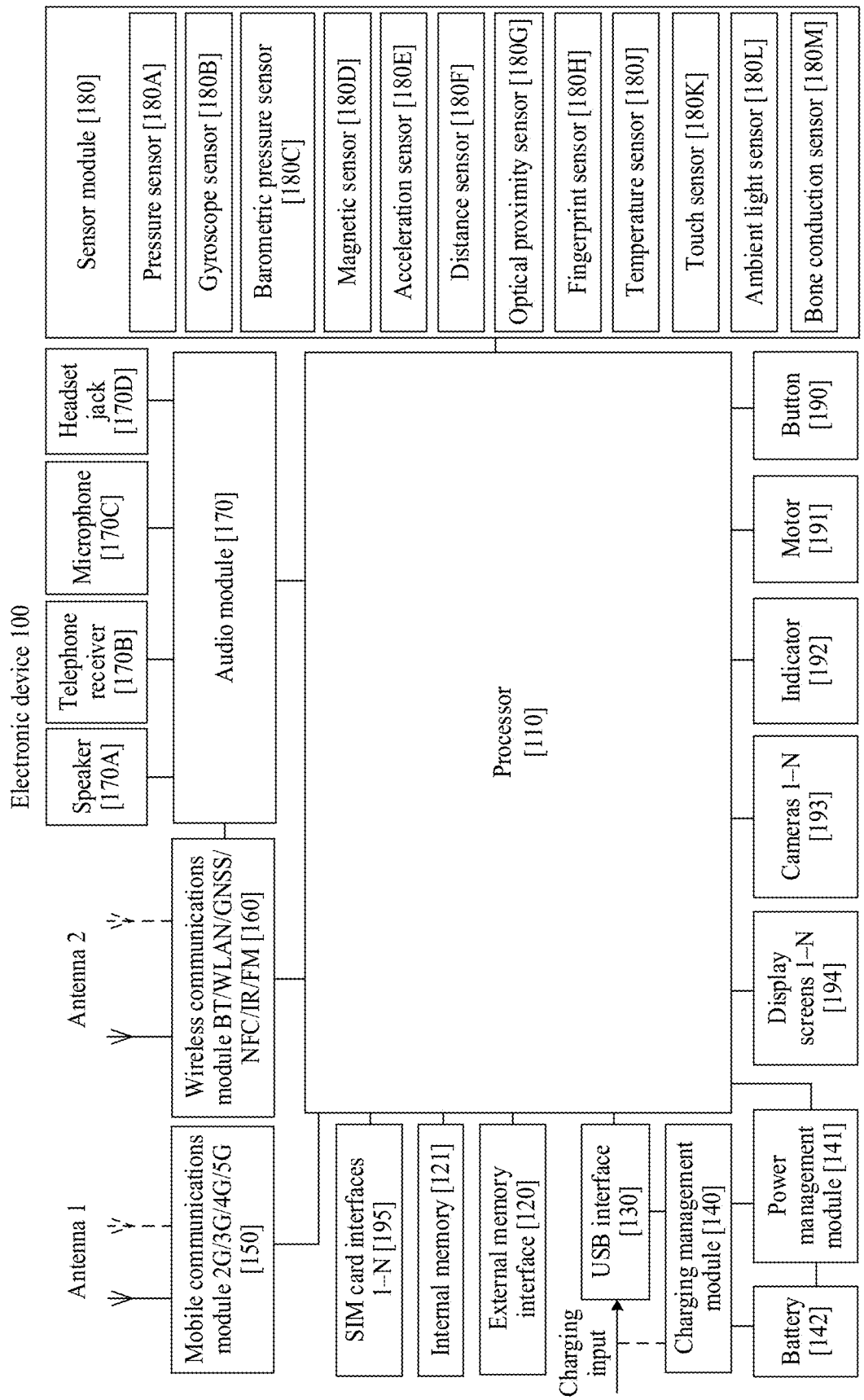
FIG. 2 is a schematic structural diagram of a mobile phone according to an embodiment of this application.

For example, as shown in FIG. 2, the following uses the electronic device 100 as an example to specifically describe this embodiment.

The electronic device 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display screen 194, an SIM card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the schematic structure in this embodiment of the present invention constitutes no specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be separate components, or may be integrated into one or more processors.

The controller may be a nerve center and a command center of the electronic device 100. The controller may generate an operation control signal based on an instruction operation code and a time sequence signal, to complete control of instruction reading and instruction execution.

The memory may be further disposed in the processor 110, to store an instruction and data. In some embodiments, the memory in the processor 110 is a cache. The memory may store an instruction or data that is used or cyclically used by the processor 110. If the processor 110 needs to use the instruction or the data again, the processor 110 may directly invoke the instruction or the data from the memory, so as to avoid repeated access, and reduce a waiting time of the processor 110, thereby improving system efficiency.

In some embodiments, the processor 110 may include one or more interfaces. The interface may be an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through an I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communications module 160 through an I2S interface, to implement a function of answering a call over a Bluetooth headset.

The PCM interface may be also configured to perform audio communication, to perform sampling, quantization, and encoding on an analog signal. In some embodiments, the audio module 170 may be coupled to the wireless communications module 160 through a PCM bus interface. In some embodiments, the audio module 170 may also transmit an audio signal to the wireless communications module 160 through a PCM interface, to implement a function of answering a call over a Bluetooth headset. Both the I2S interface and the PCM interface may be configured to perform audio communication.

The UART interface is a universal serial data bus, and is configured to perform asynchronous communication. The bus may be a two-way communications bus. The UART interface switches to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through a UART interface, to implement a Bluetooth function. In some embodiments, the audio module 170 may transmit an audio signal to the wireless communications module 160 through a UART interface, to implement a function of playing music over a Bluetooth headset.

The MIPI interface may be configured to connect to the processor 110 and a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through a CSI interface, to implement a photographing function of the electronic device 100. The processor 110 communicates with the display screen 194 through a DSI interface, to implement a display function of the electronic device 100.

The GPIO interface may be configured by using software. The GPIO interface may be configured as a control signal, or may be configured as a data signal. In some embodiments, the GPIO interface may be configured to connect to the processor 110, the camera 193, the display screen 194, the wireless communications module 160, the audio module 170, the sensor module 180, and the like. The GPIO interface may be further configured as an I2C interface, an I2S interface, a UART interface, an MIPI interface, or the like.

The USB interface 130 is an interface that meets a USB standard specification, and may be specifically a mini USB interface, a micro USB interface, a USB type C interface, or the like. The USB interface may be configured to connect to a charger to charge the electronic device 100, or may be configured to transmit data between the electronic device 100 and a peripheral device, or may be configured to connect to a headset and play audio through the headset. The interface may be further configured to connect to another electronic device such as an AR device.

It may be understood that a schematic interface connection relationship between the modules in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger, or may be a wired charger. In some embodiments in which the charger is a wired charger, the charging management module 140 may receive a charging input from the wired charger through the USB interface. In some embodiments in which the charger is a wireless charger, the charging management module 140 may receive a charging input from the wireless charger over a wireless charging coil of the electronic device 100. When charging the battery 142, the charging management module 140 may further supply power to the electronic device over the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna module 1, the antenna module 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may be multiplexed to improve utilization of the antennas. For example, a cellular network antenna may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (Low Noise Amplifier, LNA), and the like. The mobile communications module 150 may receive an electromagnetic wave over the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation over the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal over an audio device (which is not limited to the speaker 170A, the telephone receiver 170B, and the like), or displays an image or a video over the display screen 194. In some embodiments, the modem processor may be an independent component. In some other embodiments, the modem processor may be separate from the processor 110, and the modem processor and the mobile communications module 150 or another function module may be disposed in a same component.

The wireless communications module 160 may provide a solution to wireless communication applied to the electronic device 100, for example, a wireless local area network (wireless local area networks, WLAN), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components into which at least one communication processing module is integrated. The wireless communications module 160 receives an electromagnetic wave over the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 and the mobile communications module 150 of the electronic device 100 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function over the GPU, the display screen 194, the application processor, and the like. The GPU is a microprocessor for image processing, and connects to the display screen 194 and the application processor. The GPU is configured to perform mathematical and geometrical calculation, and is configured to perform graphics rendering. The processor 110 may include one or more GPUs, and execute a program instruction to generate or change display information.

The display screen 194 is configured to display an image, a video, and the like. The display screen 194 includes a display panel. The display panel may use an LCD (liquid crystal display, liquid crystal display), an OLED (organic light-emitting diode, organic light-emitting diode), an active-matrix organic light emitting diode (active-matrix organic light emitting diode, AMOLED), a flexible light-emitting diode (flex light-emitting diode, FLED), a Mini-Led, a MicroLed, a Micro-oLed, a quantum dot light emitting diode (quantum dot light emitting diodes, QLED), and the like. In some embodiments, the electronic device 100 may include one or N display screens, and N is a positive integer greater than 1.

The electronic device 100 may implement a photographing function over the ISP, the camera 193, the video codec, the GPU, the display screen 194, the application processor, and the like.

The ISP is configured to process data fed back by the camera 193. For example, during photo taking, a shutter is pressed, a ray of light is transmitted to a light-sensitive element of the camera through a lens, an optical signal is converted into an electrical signal, and the light-sensitive element of the camera transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and the image is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras, and N is a positive integer greater than 1.

The digital signal processor is configured to process a digital signal, and may process another digital signal in addition to a digital image signal. For example, when the electronic device 100 performs frequency selection, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, MPEG1, MPEG2, MPEG3, and MPEG4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

The external memory interface 120 may be configured to connect to an external storage card such as a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer executable program code, and the executable program code includes an instruction. The processor 110 runs the instruction stored in the internal memory 121, to perform various function applications and data processing of the electronic device 100. The memory 121 may include a program storage area and a data storage area. The program storage area may store an operating system, an application required by at least one function (such as a voice play function and an image play function), and the like. The data storage area may store data (for example, audio data and an address book) and the like created when the electronic device 100 is used. In addition, the memory 121 may include a high-speed random access memory, or may include a non-volatile memory such as at least one magnetic disk memory, a flash memory, or a universal flash storage (universal flash storage, UFS).

The electronic device 100 may implement an audio function such as music playing or recording over the audio module 170, the speaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The telephone receiver 170B, also referred to as an "earpiece", is configured to convert an audio electrical signal into a sound signal. When the electronic device 100 is used to answer a call or receive voice information, the telephone receiver 170B may be put close to a human ear, to receive the voice information.

The microphone 170C, also referred to as a "microphone" or "microphone", is configured to convert a sound signal into an electrical signal. When making a call or sending voice information, a user may speak with the mouth approaching the microphone 170C, to input a sound signal to the microphone 170C. At least one microphone 170C may be disposed in the electronic device 100. In some other embodiments, two microphones may be disposed in the electronic device 100, to collect a sound signal and implement a noise reduction function. In some other embodiments, three, four, or more microphones may be alternatively disposed in the electronic device 100, to collect a sound signal, implement noise reduction, recognize a sound source, implement a directional recording function, and the like.

The headset jack 170D is configured to connect to a wired headset. The headset jack may be a USB interface, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a touch location based on a detection signal of the pressure sensor 180A. In some embodiments, touch operations that are performed on a same touch location but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device 100. In some embodiments, the gyroscope sensor 180B may be used to determine angular velocities of the electronic device 100 around three axes (namely, axes x, y, and z). The gyroscope sensor 180B may be configured to perform image stabilization during photo taking. For example, when a shutter is pressed, the gyroscope sensor 180B detects a jittering angle of the electronic device 100, calculates, based on the angle, a distance for which a lens module needs to compensate, and enables the lens to offset jittering of the electronic device 100 through reverse motion, so as to implement image stabilization. The gyroscope sensor 180B may be further used for a navigation scenario and a motion sensing game scenario.

The barometric pressure sensor 180C is configured to measure atmospheric pressure. In some embodiments, the electronic device 100 calculates an altitude by using the atmospheric pressure measured by the barometric pressure sensor 180C, to assist positioning and navigation.

The magnetic sensor 180D includes a Hall sensor. The electronic device 100 may detect opening and closing of a flip leather cover by using the magnetic sensor 180D. In some embodiments, when the electronic device 100 is a flip phone, the electronic device 100 may detect opening and closing of the flip cover based on the magnetic sensor 180D. Further, a feature such as automatic unlocking of the flip cover is set based on a detected open-closing state of a leather cover or a detected open-closing state of the flip cover.

The acceleration sensor 180E may detect magnitude of acceleration of the electronic device 100 in various directions (usually on three axes). When the electronic device 100 is still, a value and a direction of gravity may be detected. The acceleration sensor 180E may be further configured to recognize a posture of the electronic device, and is applied to an application such as switching between landscape orientation and portrait orientation and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The electronic device 100 may emit infrared light by using the light emitting diode. The electronic device 100 detects infrared reflected light from a nearby object by using the photodiode. When detecting adequate reflected light, the electronic device 100 may determine that there is an object near the electronic device 100. When detecting inadequate reflected light, the electronic device 100 may determine that there is no object near the electronic device 100. The electronic device 100 may detect, by using the optical proximity sensor 180G, that a user puts the electronic device 100 close to an ear for conversation, so that automatic screen-off is implemented, to achieve power saving. The optical proximity sensor 180G may be further configured to automatically unlock and lock the screen in a leather cover mode and a pocket mode.

The ambient light sensor 180L is configured to sense luminance of ambient light. The electronic device 100 may adaptively adjust luminance of the display screen 194 based on the sensed luminance of the ambient light. The ambient light sensor 180L may be further configured to automatically adjust white balance during photo taking. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint unlock, application access lock, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142, to avoid an abnormal shutdown caused by a low temperature.

The touch sensor 180K, also referred to as a "touch panel", may be disposed on the display screen 194, and is configured to detect a touch operation performed on or near the touch panel. A detected touch operation may be transmitted to the application processor to determine a touch event type, and a corresponding visual output is provided by using the display screen 194. In some other embodiments, the touch sensor 180K may be alternatively disposed on a surface of the electronic device 100, and is located on a location different from that of the display screen 194. In this embodiment of this application, the touch panel is configured to receive a touch operation such as a first operation, a confirmation operation of a language setting control, a close operation, or an exit operation.

The bone conduction sensor 180M may obtain a vibration signal. In some embodiments, the bone conduction sensor 180M may obtain a vibration signal of a vibration bone of a human vocal-cord part. The bone conduction sensor 180M may contact a human pulse, and receive a blood pressure beating signal. In some embodiments, the bone conduction sensor 180M may also be disposed in the headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button may be a mechanical button, or may be a touch button. The electronic device 100 may receive a key input, and generate a key signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different areas of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging state and a battery change, and may be further configured to indicate a message, a missed call, a notification, and the like.

The SIM card interface 195 is configured to connect to a subscriber identity module (subscriber identity module, SIM). A SIM card may be inserted into the SIM card interface or detached from the SIM card interface, to implement contact with and detaching from the electronic device 100. The electronic device 100 may support one or N SIM card interfaces, and N is a positive integer greater than 1. The SIM card interface 195 may support a nano SIM card, a micro SIM card, a SIM card, and the like. A plurality of cards may be inserted into a same SIM card interface at the same time. The plurality of cards may be of a same type or different types. The SIM card interface 195 may be alternatively compatible with different types of SIM cards. The SIM card interface 195 may be also compatible with an external storage card. The electronic device 100 interacts with a network by using a SIM card, to implement functions such as conversation and data communication. In some embodiments, the electronic device 100 uses an eSIM, namely, an embedded SIM card. The eSIM card may be embedded into the electronic device 100, and cannot be detached from the electronic device 100. A software system of the electronic device 100 may use a layered architecture, an event-driven architecture, a microkernel architecture, a micro service architecture, or a cloud architecture. In this embodiment of the present invention, a software structure of the electronic device 100 is illustrated by using an Android system with a layered architecture as an example.

Figure 3:
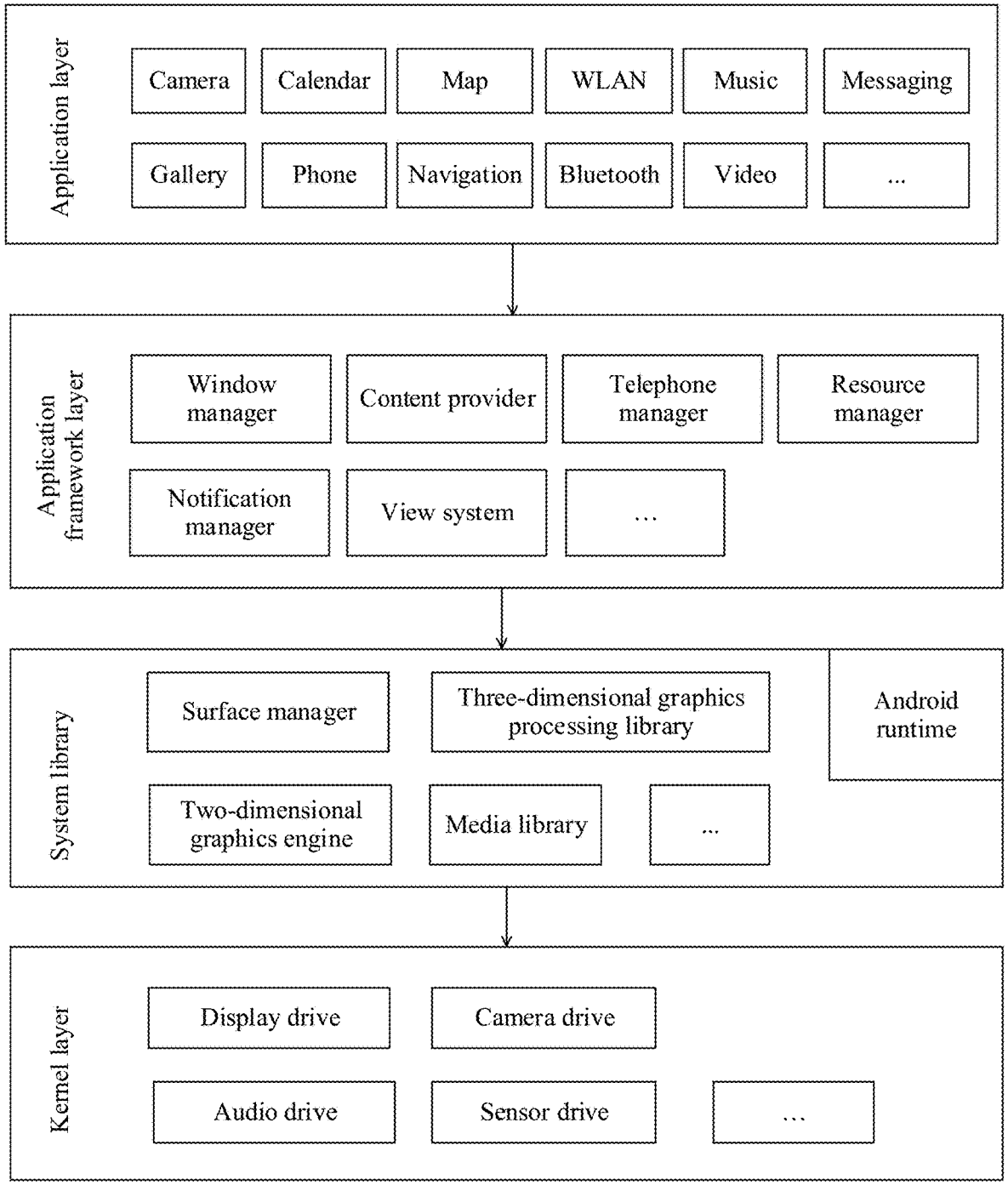
FIG. 3 is a schematic structural diagram of an Android operating system according to an embodiment of this application.

FIG. 3 is a block diagram of the software structure of the electronic device 100 in this embodiment of the present invention.

In the layered architecture, software is divided into several layers, and each layer has a clear role and task. Layers communicate with each other over a software interface. In some embodiments, the Android system is divided into four layers from top to bottom: an application layer, an application framework layer, an Android runtime (Android runtime) and system library, and a kernel layer.

The application layer may include a series of application packages.

As shown in FIG. 3, the application packages may include applications such as Dialer, Camera, Gallery, Calendar, Phone, Map, Navigation, WLAN, Bluetooth, Music, Video, and Massaging.

The application framework layer provides an application programming interface (application programming interface, API) and a programming framework for the applications at the application layer. The application framework layer includes some predefined functions.

As shown in FIG. 3, the application framework layer may include a window manager, a content provider, a view system, a telephone manager, a resource manager, a notification manager, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, audio, calls that are made and received, a browsing history and bookmarks, an address book, and the like.

The view system includes a visual control such as a control for text display or a control for picture display. The view system may be configured to construct an application. The display interface may include one or more views. For example, the display interface including an SMS notification icon may include a view for displaying a text and a view for displaying a picture.

The telephone manager is configured to provide a communication function of the electronic device 100, for example, dialing status management (including connection and hang-up).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completing, a message prompt, and the like. The notification manager may be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android runtime includes a kernel library and a virtual machine. The Android runtime is responsible for scheduling and managing the Android system.

The kernel library includes two parts: One part is a performance function that the java language needs to schedule, and the other part is a kernel library of the Android.

The application layer and the application framework layer run on the virtual machine. The virtual machine executes java files of the application layer and the application framework layer as binary files. The virtual machine is configured to execute functions such as object lifecycle management, stack management, thread management, security and exception management, and garbage collection.

The system library may include a plurality of function modules, for example, a surface manager (surface manager), a media library (Media Libraries), a three-dimensional graphics processing library (OpenGL ES), and a 2D graphics engine (SGL).

The surface manager is configured to manage a display subsystem, and converge 2D and 3D layers of a plurality of applications.

The media library supports playback and recording of a plurality of common audio and video formats, a static image file, and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display drive, a camera drive, an audio drive, and a sensor drive.

Figure 4A:
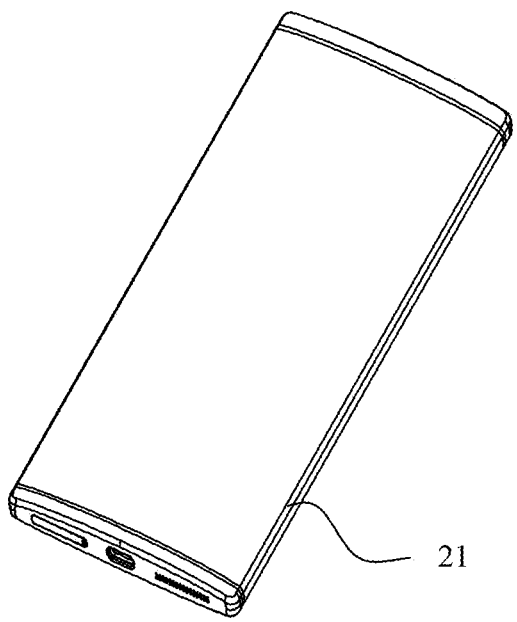
FIG. 4a to FIG. 4e are schematic structural diagrams of a mobile phone according to an embodiment of this application.
Figure 4B:
Figure 4C:

FIG. 4a is a three-dimensional diagram of a mobile phone to which an embodiment of this application is applicable. FIG. 4b is a bottom view of the mobile phone, and a charging port and a card slot are disposed at the bottom. In FIG. 4a and FIG. 4b, a screen of the mobile phone is a curved display screen 21 of a convex arc structure. A pressure sensor 22 is disposed in a side area of the curved display screen of the mobile phone, and is configured to detect a magnitude of acting force of a user on the curved screen, to implement functions corresponding to a virtual power button and a virtual volume button. FIG. 4c is a sectional view of the mobile phone, and the pressure sensor 22 is disposed below a capacitive touchscreen in the side area.

Figure 4D:
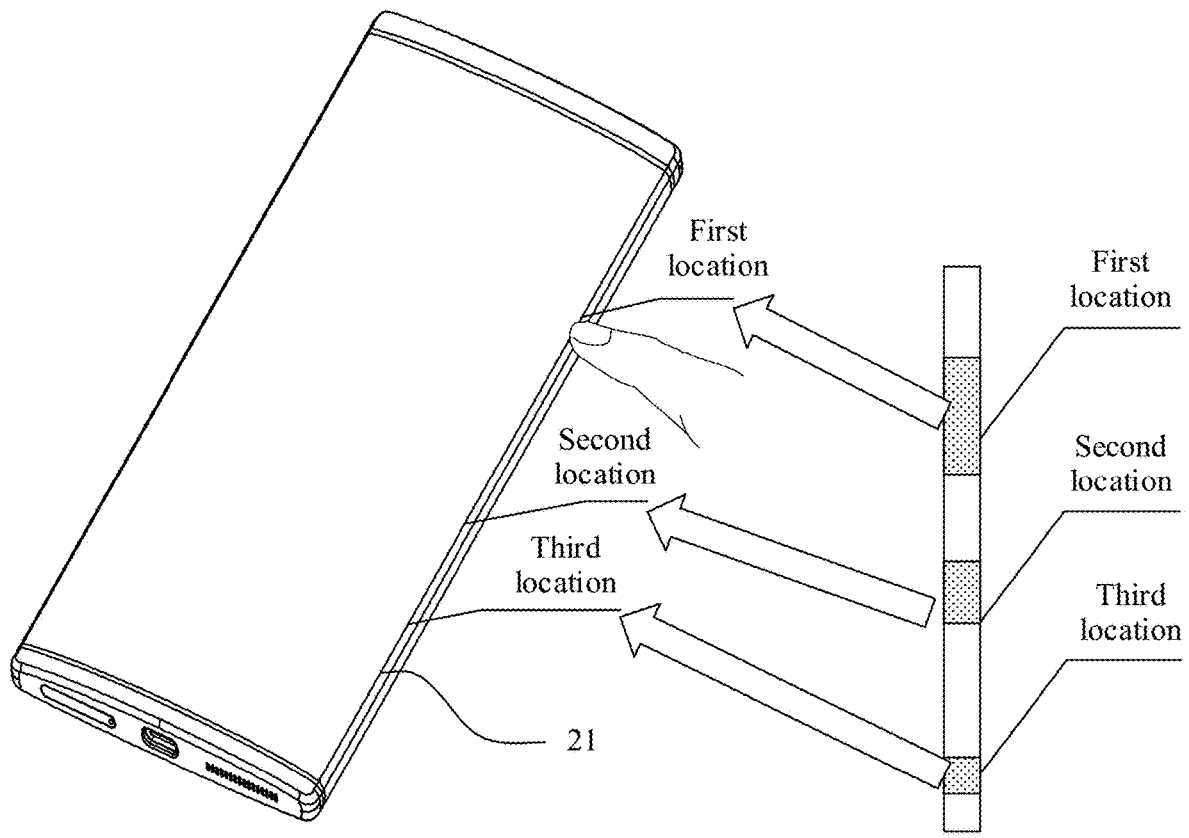

For example, as shown in FIG. 4d, it is assumed that a pressure sensing strip is disposed below the capacitive touchscreen at a first location in the side area of the mobile phone, and the pressure sensing strip is configured to implement the function of the virtual power button; a pressure sensing strip is disposed below the capacitive touchscreen at a second location in the side area of the mobile phone, and the pressure sensing strip is configured to implement a function of a virtual volume up button; and a pressure sensing strip is disposed below the capacitive touchscreen at a third location in the side area of the mobile phone, and the pressure sensing strip is configured to implement a function of a virtual volume down button. When the mobile phone is in a black screen state, if an index finger of the user touches the first location on the side, and acting force of the user at the first location is greater than a specified threshold, the screen of the mobile phone is lighted. When the mobile phone is playing music, a volume is increased by one level if a thumb of the user touches the second location on the side, and acting force of the user at the first location is greater than the specified threshold. A volume is reduced by one level if the thumb of the user touches the third location on the side, and acting force of the user at the third location is greater than the specified threshold.

Figure 4E:
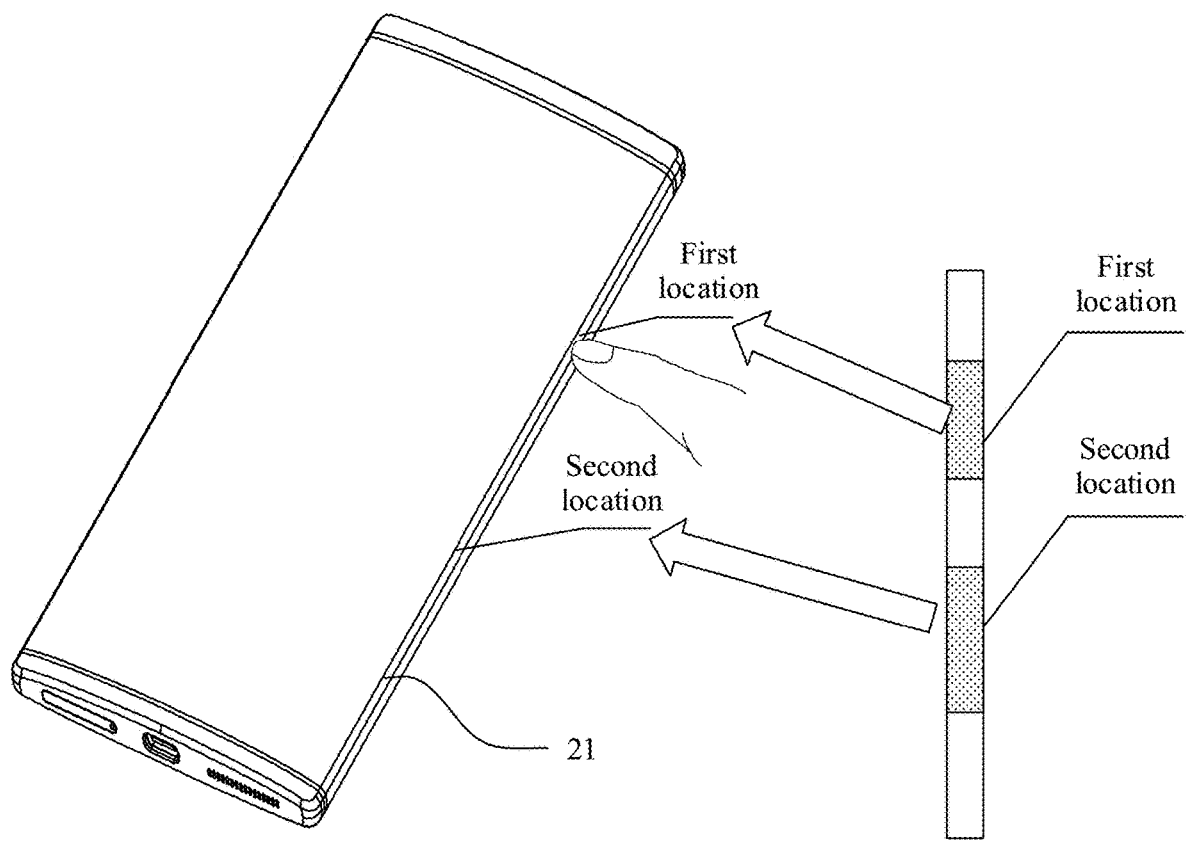

For another example, as shown in FIG. 4e, it is assumed that a pressure sensing strip is disposed below the capacitive touchscreen at a first location in the side area of the mobile phone, and the pressure sensing strip is configured to implement the function of the virtual power button. It is assumed that the virtual volume button is disposed at a second location in the side area of the curved screen of the mobile phone. When the mobile phone is playing music, a volume is increased by one level if a distance from which the thumb of the user slides upward at the second location on the side and pressure meet the specified threshold, and a volume is reduced by one level if both a distance from which the thumb of the user slides downward at the second location on the side and acting force meet the specified threshold.

In addition to the implementations shown in FIG. 4d and FIG. 4e, in another possible design, the virtual power button and the virtual volume button may be separately disposed in different side areas of the curved display screen. For example, in FIG. 4e, the virtual volume button is disposed in a side area that is of the curved display screen and that is touched by a finger of the user, and the virtual power button is disposed in a side area of an opposite side of the curved display screen.

Considering that the user holds the mobile phone in different postures, magnitudes of acting force exerted on the curved screen in the side area of the mobile phone are also different. A misoperation may occur if a preset threshold of a touch parameter on the side is a fixed value. For example, when the user lies flat on the bed and holds the mobile phone to watch a movie, to overcome gravity of the mobile phone, the finger of the user holds the mobile phone with greater force than a posture in which the user sits and looks at the mobile phone horizontally. In this case, it is possible that a sound volume is increased by one level by mistake because acting force of pressing the second location in the side area of FIG. 4d by a middle finger of the user is greater than preset pressure (for example, a preset pressure value is still 0.5 N). However, in this case, the user may not intend to increase the volume, thereby resulting in a misoperation and bringing inconvenience to the user.

Therefore, an embodiment of this application provides a touchscreen response method. The method is applicable to an electronic device having a curved screen. The method includes: When the electronic device detects a touch operation performed by a user on the curved screen in a side area, the electronic device first identifies a device status, for example, a vertical portrait state, a vertical landscape state, a portrait or landscape state with a tilt angle, a black screen state, a screen-on state, or a motion state; the electronic device correspondingly adjusts a preset threshold of a touch parameter of a curved screen in each side area of a mobile phone based on the determined device status according to a preset rule; and then the electronic device determines whether the touch operation performed by the user on the curved screen in the side area meets the adjusted preset threshold of the touch parameter, and responds to the touch operation if yes, or makes no response if no. The method can filter a misoperation of the user and reduce a probability of misoperations of the user. With reference to accompanying drawings and application scenarios, the following describes in detail the touch response method provided in this embodiment of this application by using an example in which the electronic device is a mobile phone.

It should be noted that, before the electronic device identifies the device status, data collected by a built-in sensor of the mobile phone needs to be first converted from a mobile phone coordinate system to a geodetic reference coordinate system. A reason is as follows: Although a plurality of sensors such as an acceleration sensor, a gyroscope, a magnetometer, and a direction sensor that are built in a smartphone may perceive different motions, directions, and external environments, the data is based on the mobile phone coordinate system, and data collected when a placing location or a direction of the mobile phone changes accordingly. In reality, personalization of user's usage habits of the mobile phone, for example, different placing locations of the mobile phone such as whether the mobile phone is held in a hand or is placed in a pocket or a handbag, directly affects an identification result of the device status. That is, in actual application, because of diversity of the user's usage habits and random placement locations of the mobile phone, the data collected by the built-in sensor of the mobile phone needs to be converted from the mobile phone coordinate system to a unified reference coordinate system (for example, a geodetic coordinate system). In this way, converted data of the sensor has a clearer physical meaning, thereby accurately identifying the device status of the electronic device.

Figure 5A:
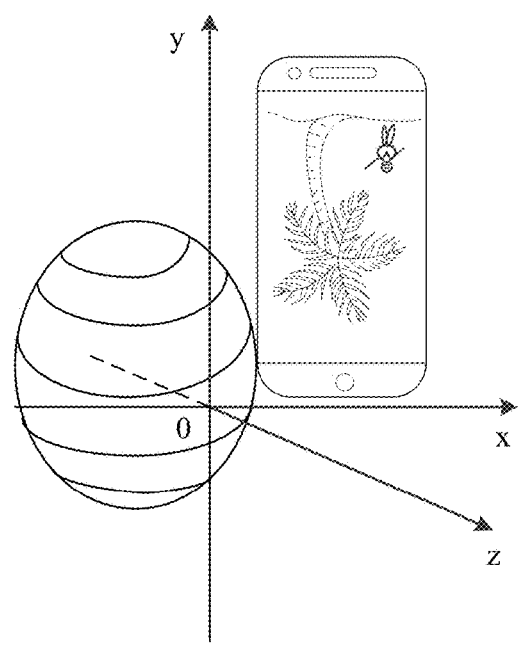
FIG. 5a and FIG. 5b are a schematic diagram of a geodetic coordinate system and a mobile phone coordinate system according to an embodiment of this application.

As shown in FIG. 5a, a definition manner of the geodetic reference coordinate system is as follows: A positive direction of an x axis is tangent to a ground of a current location of the mobile phone and points straight to the east; a positive direction of a y axis is also tangent to the ground and points to a magnetic north pole, and a plane on which the x axis and a z axis are located is a horizontal plane; and a positive direction of the z axis is perpendicular to the horizontal plane and points to the sky.

Figure 5B:
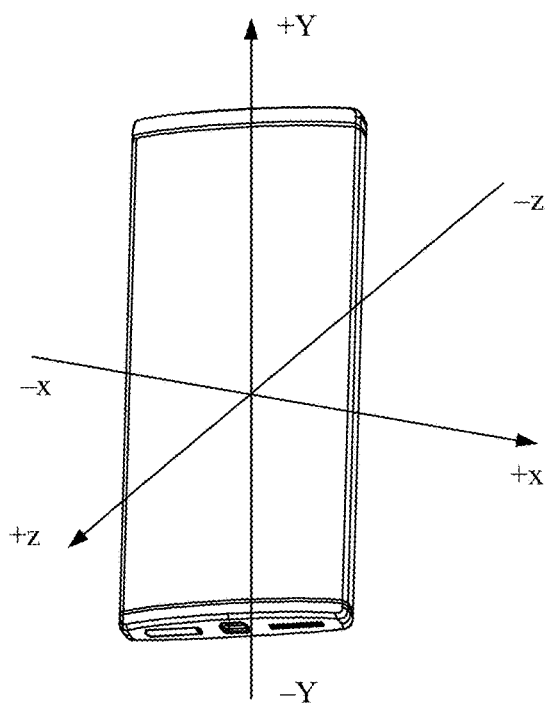

As shown in FIG. 5b, determining of the mobile phone coordinate system is related to the screen of the mobile phone. A definition manner of the mobile phone coordinate system is as follows: A positive direction of an X axis is a direction pointed to the right from a center of a screen plane of the mobile phone, and a reverse direction is a negative direction of the X axis; a positive direction of a Y axis is a direction pointed upward from the center of the screen plane of the mobile phone and is perpendicular to the X axis, and a reverse direction is a negative direction of the Y axis; and a positive direction of a Z axis is a direction that is perpendicular to the screen plane of the mobile phone and that is pointed upward from the center of the screen plane, and a reverse direction is a negative direction of the Z axis.

An embodiment of this application provides a formula for converting the mobile phone coordinate system into the geodetic reference coordinate system, as shown in formula 1:

$$\begin{bmatrix} X \\ Y \\ Z \end{bmatrix} = R \cdot \begin{bmatrix} x \\ y \\ z \end{bmatrix} \quad \text{Formula [1]}$$

X/Y/Z is sensor data of the mobile phone coordinate system, R is a rotation matrix, and x, y, and z are sensor data of the geodetic reference coordinate system.

R is obtained by combining three basic rotation matrices, and R is shown in formula 2:

$$R = \begin{bmatrix} \cos a & 0 & \sin a \\ 0 & 1 & 0 \\ -\sin a & 0 & \cos a \end{bmatrix} \begin{bmatrix} 1 & 0 & 0 \\ 0 & \cos p & -\sin p \\ 0 & \sin p & \cos p \end{bmatrix} \begin{bmatrix} \cos r & -\sin r & 0 \\ \sin r & \cos r & 0 \\ 0 & 0 & 1 \end{bmatrix} \quad \text{Formula [2]}$$

$$= \begin{bmatrix} \cos a \cos r + \sin a \sin p \sin r & -\cos a \sin r + \sin a \sin p \cos r & \sin a \cos p \\ \sin r \cos p & \cos r \cos p & -\sin p \\ -\sin a \cos r + \cos a \sin p \sin r & \sin r \sin a + \cos a \sin p \cos r & \cos a \cos p \end{bmatrix}$$

Variables a, p, and r respectively represent azimuth, pitch, and roll, where azimuth represents an included angle between the magnetic north pole and the Y axis of the mobile phone coordinate system, pitch represents an included angle between the X axis of the mobile phone coordinate system and the horizontal plane, and roll represents an included angle between the Y axis of the mobile phone coordinate system and the horizontal plane.

In other words, based on the foregoing coordinate system conversion method, the mobile phone may determine a status of the mobile phone in the geodetic coordinate system based on the converted data of the sensor, for example, a vertical portrait state, a vertical landscape state, or a portrait or landscape state with a tilt angle. Specifically, in this embodiment of this application, a location status of the mobile phone in the geodetic coordinate system is determined by using converted data generated by the gyroscope sensor and the gravity sensor, and a device status of the mobile phone is represented by using the location status. In addition, the mobile phone directly determines, by using a system parameter, whether the mobile phone is in a portrait state or a landscape state, and determines, by using the acceleration sensor, whether the mobile phone is in a motion state or a still state.

Scenario 1

It is assumed that when it is determined that the mobile phone is currently in a portrait state, and the curved screen of the mobile phone is parallel to the horizontal plane, or in other words, the mobile phone is in a state shown in FIG. 5a, an included angle between the curved screen of the mobile phone and the horizontal plane is 0 degrees. When the mobile phone in the state shown in FIG. 5a rotates 90 degrees clockwise (viewed from the positive direction of the Z axis) by using the bottom of the mobile phone as a central axis, and the top of the mobile phone falls on the plane on which the X axis and the Z axis are located, the included angle between the curved screen of the mobile phone and the horizontal plane is 90 degrees. When the mobile phone in the state shown in FIG. 5a rotates 180 degrees clockwise (viewed from the positive direction of the Z axis) by using the bottom of the mobile phone as the central axis, and the top of the mobile phone falls on the horizontal plane, the included angle between the curved screen of the mobile phone and the horizontal plane is 180 degrees. The following embodiments separately describe different angles between the curved screen of the mobile phone and the horizontal plane during portrait orientation of the mobile phone.

Case 1: The angle between the curved screen of the mobile phone and the horizontal plane falls within a range of (0 degrees, 60 degrees].

Figure 6A:
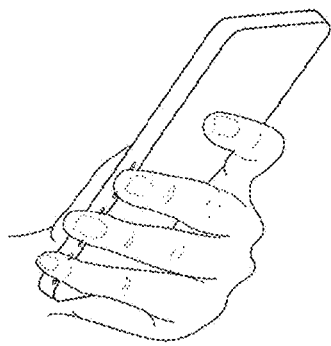
FIG. 6a to FIG. 6d are a schematic diagram of a user holding manner according to an embodiment of this application.

For example, if the user sits on a sofa and holds the mobile phone with a left hand, the angle between the curved screen of the mobile phone and the horizontal plane is approximately 60 degrees, and the mobile phone is in portrait orientation, as shown in FIG. 6a. In this case, a weight of the mobile phone basically falls on a palm of the left hand of the user, a thumb fingertip, and a portion between the thumb and the index finger, and fingertips of the remaining four fingers only need to exert slight acting force on the curved screen in the side area to prevent the mobile phone from sliding off two sides. Therefore, in this case, the mobile phone determines a response threshold of a touch parameter of the curved screen in the side area of the mobile phone as a reference value based on a current included angle between the curved screen of the mobile phone and the horizontal plane and a portrait state of the mobile phone. The mobile phone responds only when a touch operation of the user on the curved screen in the side area meets the reference value. For example, the screen of the mobile phone is off when a pressure value of pressing the virtual power button on the side by the user is greater than 1 N. For another example, a sound volume is increased by one level when a sliding distance of the thumb of the user on the curved screen in the side area is greater than 1 cm and a pressure value is greater than 0.5 N.

Case 2: The angle between the curved screen of the mobile phone and the horizontal plane falls within a range of (60 degrees, 90 degrees].

Figure 6B:
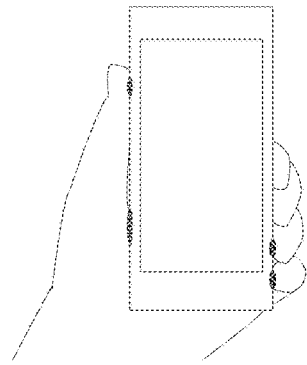

For example, if the user holds the mobile phone with a left hand and the user looks at the screen of the mobile phone horizontally, an inclination angle between the curved screen of the mobile phone and the plane on which the X axis and the Z axis are located is approximately 90 degrees, and the mobile phone is currently in portrait orientation, as shown in FIG. 6b. To overcome a gravity effect of the mobile phone, the user exerts acting force on the curved screen in the side area mainly by using a thumb fingertip, a portion between the thumb and the index finger, and fingertips of the other four fingers. Therefore, a touch area of the left hand on the curved screen in the side area may include four areas shown by a shaded part in FIG. 6b. In this case, the mobile phone determines a response threshold of a touch parameter of the curved screen in the side area of the mobile phone as a sum of a reference value and a first threshold based on a current included angle between the curved screen of the mobile phone and the horizontal plane and a portrait state of the mobile phone. For example, the mobile phone responds only when a pressing operation of the user on the curved screen in the side area meets the sum of the reference value and the first threshold. The first threshold is an empirical value, and may be obtained through repeated tests. The first threshold is usually related to the acting force exerted by the user on the curved screen in the side area to overcome gravity of the mobile phone.

Case 3: The angle between the curved screen of the mobile phone and the horizontal plane falls within a range of (90 degrees, 180 degrees).

Figure 6C:
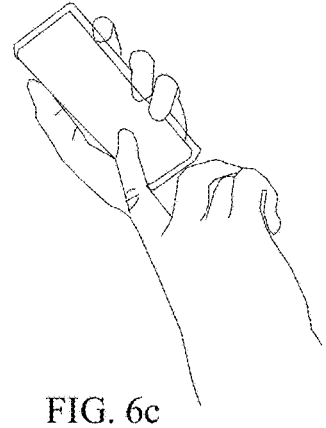

For example, if the user holds the mobile phone with a left hand and the user lies on the bed and looks at the screen of the mobile phone, an inclination angle between the curved screen of the mobile phone and the plane on which the X axis and the Z axis are located is approximately 120 degrees, and the mobile phone is currently in portrait orientation, as shown in FIG. 6c. To overcome a gravity effect of the mobile phone, the user mainly uses five fingers of the user to forcefully clamp sides of the mobile phone. In this case, the mobile phone determines a response threshold of a touch parameter of the curved screen in the side area of the mobile phone as a sum of a reference value and a second threshold based on a current included angle between the curved screen of the mobile phone and the horizontal plane and a portrait state of the mobile phone. For example, the mobile phone responds only when a pressing operation of the user on the curved screen in the side area meets the sum of the reference value and the second threshold. The second threshold is greater than the first threshold, and the second threshold is also an empirical value, and is related to acting force exerted by the user on the curved screen in the side area to overcome gravity of the mobile phone.

Case 4: The angle between the curved screen of the mobile phone and the horizontal plane is 180 degrees.

Figure 6D:
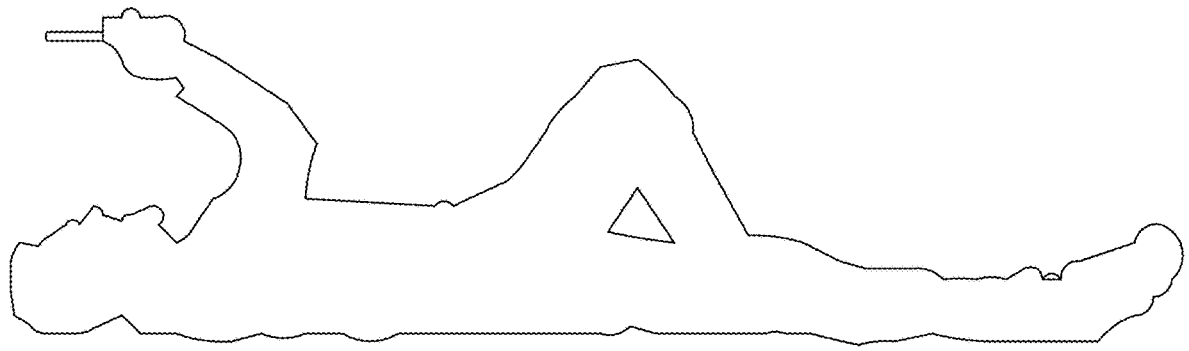

For example, if the user holds the mobile phone with a left hand and the user lies on the bed and looks at the mobile phone horizontally, an inclination angle between the curved screen of the mobile phone and the horizontal plane is approximately 180 degrees, and the mobile phone is currently in portrait orientation, as shown in FIG. 6d. To overcome a gravity effect of the mobile phone, the user mainly uses five fingers of the user to forcefully clamp sides of the mobile phone. In this case, it is determined that a response threshold of a touch parameter of the curved screen in the side area of the mobile phone is a sum of a reference value and a maximum threshold. For example, the mobile phone responds only when a pressing operation of the user on the curved screen in the side area meets the sum of the reference value and the maximum threshold.

Scenario 2

Figures 7A, 7B:
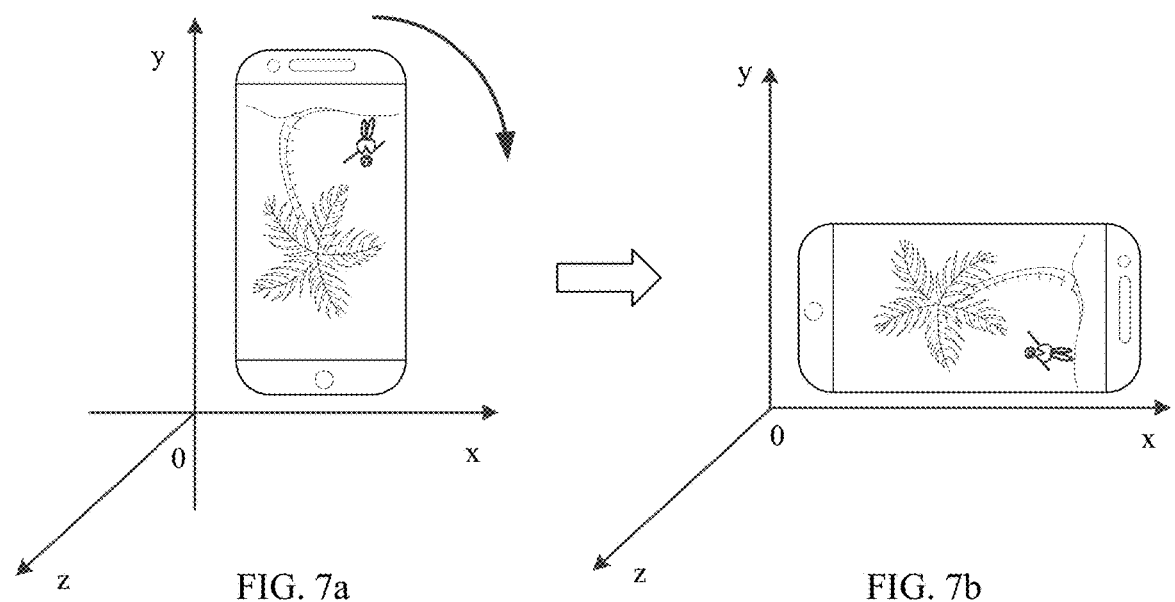
FIG. 7a and FIG. 7b are a schematic diagram of landscape orientation of a mobile phone in a geodetic coordinate system according to an embodiment of this application.

It is assumed that the mobile phone determines, by using a system parameter, that the mobile phone is currently in a landscape state. As shown in FIG. 7a and FIG. 7b, in the geodetic coordinate system, when the mobile phone is in portrait orientation shown in FIG. 7a, the mobile phone rotates clockwise (viewed from the positive direction of the X axis) by using a side of the mobile phone as a central axis, and the mobile phone is currently in a landscape state when the bottom of the mobile phone is perpendicular to the X axis. It is assumed that when the mobile phone is currently in landscape orientation, and the curved screen of the mobile phone is parallel to the horizontal plane, or in other words, the mobile phone is in a state shown in FIG. 7b, an included angle between the curved screen of the mobile phone and the horizontal plane is 0 degrees. When the mobile phone in the state shown in FIG. 7b rotates 90 degrees clockwise (viewed from the positive direction of the Z axis) by using a long side at the bottom of the mobile phone as a central axis, and another side of the mobile phone falls on the plane on which the X axis and the Z axis are located, the included angle between the curved screen of the mobile phone and the horizontal plane is 90 degrees. When the mobile phone in the state shown in FIG. 7b rotates 180 degrees clockwise (viewed from the positive direction of the Z axis) by using the long side at the bottom of the mobile phone as the central axis, and another side of the mobile phone falls on the horizontal plane, the included angle between the curved screen of the mobile phone and the horizontal plane is 180 degrees. The following embodiments separately describe different angles between the curved screen of the mobile phone and the horizontal plane during landscape orientation of the mobile phone.

Case 1: The angle between the curved screen of the mobile phone and the horizontal plane falls within a range of (0 degrees, 60 degrees].

Figures 8A, 8B, 8C:
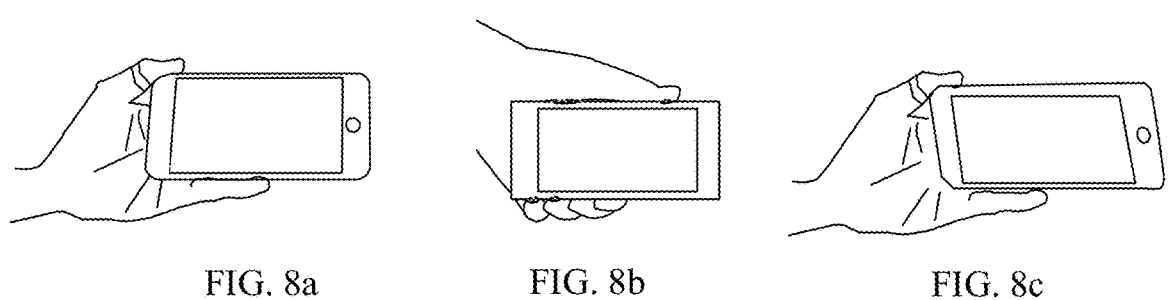
FIG. 8a to FIG. 8c are a schematic diagram of a user holding manner according to an embodiment of this application.

For example, if the user sits on a sofa and holds the mobile phone with a left hand, the angle between the curved screen of the mobile phone and the horizontal plane is approximately 60 degrees, and the mobile phone is in landscape orientation, as shown in FIG. 8a. In this case, a weight of the mobile phone basically falls on a palm and four fingers of the left hand of the user, and a thumb fingertip and a portion between the thumb and the index finger only need to exert slight acting force on the curved screen in the side area to prevent the mobile phone from falling over. In this case, based on a current included angle between the curved screen of the mobile phone and the horizontal plane and a landscape state of the mobile phone, the mobile phone determines a preset threshold of a touch parameter of the curved screen in the side area of the mobile phone above a gravity center as a reference value, and a preset threshold of a touch parameter of the curved screen in the side area of the mobile phone below the gravity center as a sum of the reference value and a third threshold. The mobile phone responds only when a touch operation of the user on the curved screen in the side area of the mobile phone above the gravity center meets the reference value, and the mobile phone responds only when a touch operation of the user on the curved screen in the side area of the mobile phone below the gravity center meets the sum of the reference value and the third threshold. For example, the screen of the mobile phone is off when a pressure value of pressing the virtual power button on an upper side by the thumb of the user in FIG. 8a is greater than the reference value. For another example, a sound volume is increased by one level when a sliding distance of a little finger of the user on the curved screen in a lower side area in FIG. 8a is greater than a sum of a reference value of a sliding distance parameter and the third threshold and a pressure value on the virtual volume button is greater than a sum of a reference value of a pressure threshold parameter and the third threshold. The third threshold is also an empirical value, and is related to acting force exerted by the user on the curved screen in the side area to overcome gravity of the mobile phone.

Case 2: The angle between the curved screen of the mobile phone and the horizontal plane falls within a range of (60 degrees, 90 degrees].

For example, if the user holds the mobile phone with a left hand and the user looks at the screen of the mobile phone horizontally, an inclination angle between the curved screen of the mobile phone and the horizontal plane is approximately 90 degrees, and the mobile phone is currently in landscape orientation, as shown in FIG. 8b. To overcome a gravity effect of the mobile phone, the user exerts acting force on the curved screen in the side area mainly by using a thumb fingertip, a portion between the thumb and the index finger, and fingertips of the other four fingers. Therefore, a touch area of the left hand on the curved screen in the side area may include four areas shown by a shaded part in FIG. 8b. In this case, based on a current included angle between the curved screen of the mobile phone and the horizontal plane and a landscape state of the mobile phone, the mobile phone determines a preset threshold of a touch parameter of the curved screen in the side area of the mobile phone above a gravity center as a sum of a reference value and a fourth threshold, and a preset threshold of a touch parameter of the curved screen in the side area of the mobile phone below the gravity center as a sum of the reference value and a fifth threshold. The fifth threshold is greater than the fourth threshold. For example, the mobile phone responds only when a pressing operation of the user on the curved screen in the side area of the mobile phone above the gravity center meets the sum of the reference value and the fourth threshold, and the mobile phone responds only when a pressing operation of the user on the curved screen in the side area of the mobile phone below the gravity center meets the sum of the reference value and the fifth threshold.

Case 3: The angle between the curved screen of the mobile phone and the horizontal plane falls within a range of (90 degrees, 180 degrees].

For example, if the user holds the mobile phone with a left hand and the user lies and looks at the screen of the mobile phone, an inclination angle between the curved screen of the mobile phone and the horizontal plane is approximately 150 degrees, and the mobile phone is currently in landscape orientation, as shown in FIG. 8c. To overcome a gravity effect of the mobile phone, the user mainly uses five fingers of the user to forcefully clamp sides of the mobile phone. In this case, based on a current included angle between the curved screen of the mobile phone and the horizontal plane and a landscape state of the mobile phone, the mobile phone determines a preset threshold of a touch parameter of the curved screen in the side area of the mobile phone above a gravity center as a sum of a reference value and a fifth threshold, and a preset threshold of a touch parameter of the curved screen in the side area of the mobile phone below the gravity center as a sum of the reference value and a sixth threshold. The fifth threshold is greater than the third threshold, and the sixth threshold is greater than the fourth threshold. For example, the mobile phone responds only when a pressing operation of the user on the curved screen in the side area of the mobile phone above the gravity center meets the sum of the reference value and the fifth threshold, and the mobile phone responds only when a pressing operation of the user on the curved screen in the side area of the mobile phone below the gravity center meets the sum of the reference value and the sixth threshold.

Scenario 3

Figure 9A:
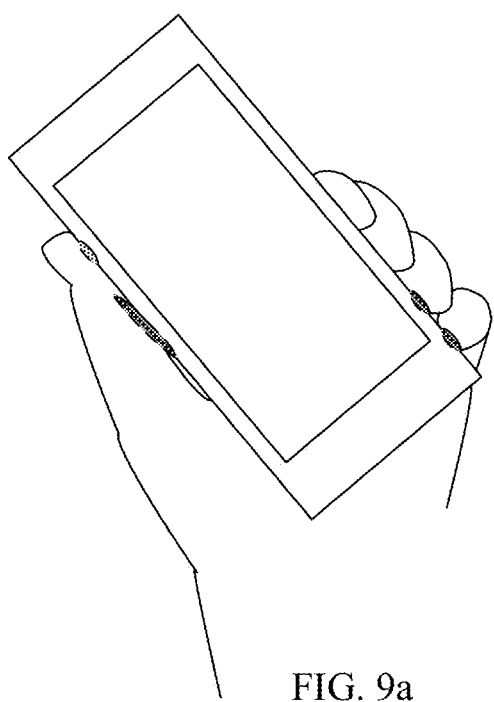
FIG. 9a and FIG. 9b are a schematic diagram of another user holding manner according to an embodiment of this application.

Case 1: For example, as shown in FIG. 9a, if the user holds the mobile phone with a left hand and the user lies on his side and looks at the screen of the mobile phone, an included angle between a side at the bottom of the mobile phone and the horizontal plane is approximately 45 degrees. To overcome a gravity effect of the mobile phone, the user mainly uses five fingers of the user and a thumb fingertip to forcefully clamp sides of the mobile phone. Therefore, a touch area of the left hand on the curved screen in the side area may include four areas shown by a shaded part in FIG. 9a. In this case, the mobile phone determines a preset threshold of a touch parameter of the curved screen in the side area of the mobile phone above a gravity center as a reference value, and the mobile phone determines a preset threshold of a touch parameter of the curved screen in the side area of the mobile phone below the gravity center as a sum of the reference value and a seventh threshold. For example, the mobile phone responds only when a pressing operation of the user on the curved screen in the side area of the mobile phone above the gravity center meets the reference value, and the mobile phone responds only when a pressing operation of the user on the curved screen in the side area of the mobile phone above the gravity center meets the sum of the reference value and the seventh threshold.

Figure 9B:
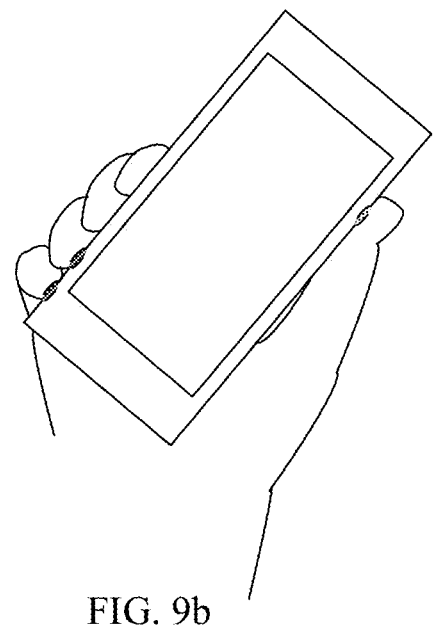

Case 2: For example, as shown in FIG. 9b, if the user holds the mobile phone with a right hand and the user lies on his side and looks at the screen of the mobile phone, an included angle between a side at the bottom of the mobile phone and the horizontal plane is approximately 45 degrees. To overcome a gravity effect of the mobile phone, the user mainly uses five fingers of the user and a thumb fingertip to forcefully clamp sides of the mobile phone. Therefore, a touch area of the left hand on the curved screen in the side area may include four areas shown by a shaded part in FIG. 9b. In this case, the mobile phone determines a preset threshold of a touch parameter of the curved screen in the side area of the mobile phone above a gravity center as a reference value, and the mobile phone determines a preset threshold of a touch parameter of the curved screen in the side area of the mobile phone below the gravity center as a sum of the reference value and an eighth threshold. For example, the mobile phone responds only when a pressing operation of the user on the curved screen in the side area of the mobile phone above the gravity center meets the reference value, and the mobile phone responds only when a pressing operation of the user on the curved screen in the side area of the mobile phone below the gravity center meets the sum of the reference value and the eighth threshold.

Scenario 4

In a possible design, in this embodiment of this application, in addition to a location status of the screen of the mobile phone in the geodetic coordinate system, a manner of adjusting a preset threshold of a touch parameter of the curved screen in the side area may be determined based on a curved screen area that is in the side area of the mobile phone and that is touched by the user when the user holds the mobile phone. If the mobile phone detects that the user touches only one side of the mobile phone, only a value of a preset threshold of a touch parameter of the side may be adjusted, or if the mobile phone detects that the user touches only the virtual power button on one side of the mobile phone, only a value of a preset threshold of a touch parameter of the virtual movie button may be adjusted.

Figure 10A:
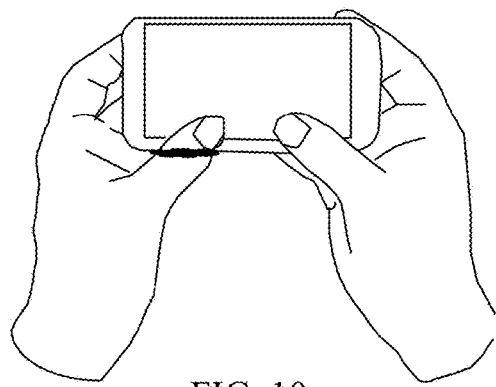
FIG. 10a to FIG. 10c are a schematic diagram of another user holding manner according to an embodiment of this application.
Figure 10B:
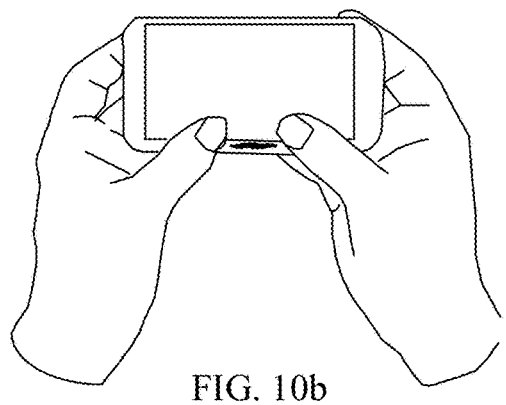
Figure 10C:
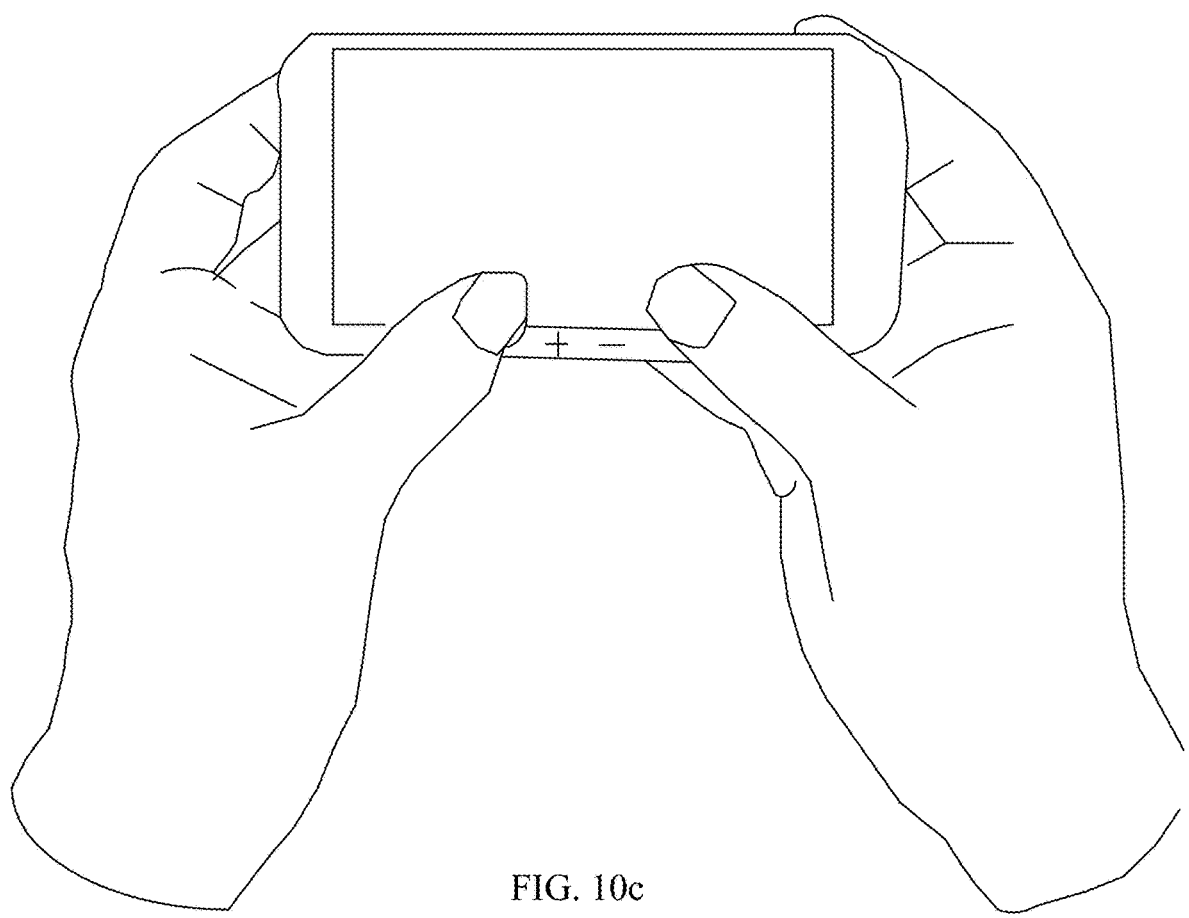

For example, the user holds the mobile phone with both hands while playing a game, only little fingers of left and right hands of the user are stuck on the curved screen in a lower side area, and the curved screen in an upper side area is not touched by the user, as shown in FIG. 10a to FIG. 10c. In this case, the mobile phone may adjust, based on a detection result, only a threshold of the curved screen in the lower side area to a reference value plus a specified threshold. It is assumed that in FIG. 10a, the user is stuck on the virtual power button on the curved screen in the lower side area by using only a little finger of the left hand. In this case, the mobile phone may adjust, based on a detection result, a threshold of the virtual power button on the curved screen in the lower side area to be the reference value plus the specified threshold.

In another possible design, for a scenario shown in FIG. 10a, in this embodiment of this application, adjusting the preset threshold of the touch parameter may be alternatively replaced with adjusting a location of a virtual button on the curved screen in the side area. For example, the virtual volume button of the mobile phone is located in an upper area on one side of the mobile phone in a portrait state. When detecting that the mobile phone is in a landscape state, the mobile phone may adjust the virtual volume button to a middle area on the side. For example, as shown in FIG. 10b, the user holds the mobile phone with both hands while playing a game. The mobile phone detects that the mobile phone is currently in a landscape state when only little fingers of left and right hands of the user are stuck under the curved screen in a lower side area, and may automatically adjust a location of the virtual volume button to a middle location of the curved screen in the side area. When detecting that the mobile phone changes to the portrait state again, the mobile phone restores the location of the virtual volume button to the upper area on the side of the mobile phone.

In a possible design, when the location of the virtual volume button changes, prompt information indicating that the location of the virtual volume button is displayed in a touch operation area may be simultaneously displayed on the curved screen. As shown in FIG. 10d, volume up and volume down control information is displayed in a middle location in a lower side of the curved screen.

It should be noted that, there may be a plurality of implementation methods for the mobile phone to identify a force-bearing area of the mobile phone held by the user. The following two manners are listed as an example in this embodiment of this application.

Manner 1: The mobile phone may analyze a force-bearing point of the user on the curved screen in the side area based on pressure data detected by a pressure sensor (P-Sensor) on the curved screen in the side area of the mobile phone, to further determine, based on the force-bearing point, a curved screen area that is in the side area of the mobile phone and that is touched by the user when the user holds the mobile phone.

Manner 2: When a human body touches a capacitive touchscreen, a capacitance change occurs because a part of current flows from the human body. Therefore, the mobile phone may identify, based on a detected capacitance change situation of the curved screen in the side area before and after touching of the user, a curved screen area that is in the side area of the mobile phone and that is touched by the user when the user holds the mobile phone. Scenario 5

In a possible design, in this embodiment of this application, in addition to a location status of the screen of the mobile phone in the geodetic coordinate system, a motion state of the mobile phone may be determined based on data collected by an acceleration sensor. For example, when the user walks with the mobile phone in one hand, the mobile phone swings back and forth with an arm. In this case, the mobile phone needs to adjust a preset threshold of a touch parameter of the curved screen in the side area according to the method shown in the foregoing scenario 1. In addition, if it is determined that the mobile phone is in a motion state, the mobile phone increases a screen response time, that is, when the mobile phone is in a motion state and a touch operation of the user on the curved screen in the side area meets the preset threshold, the mobile phone delays responding.

Figure 11:
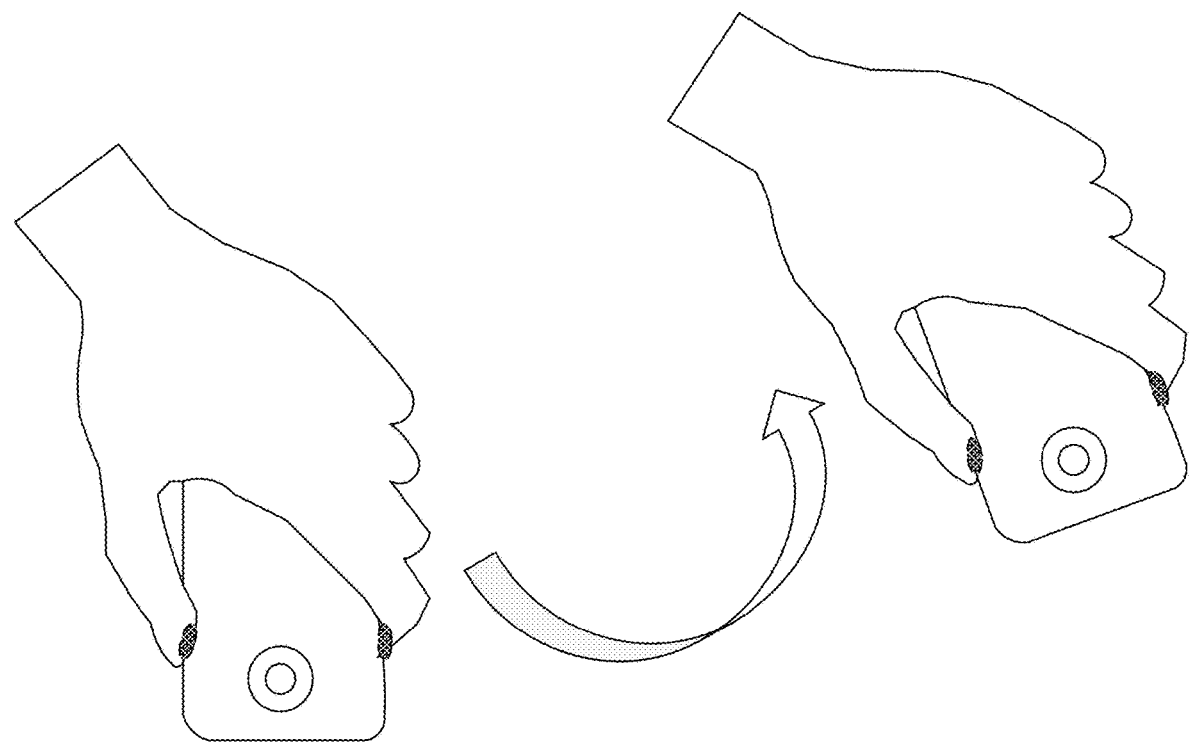
FIG. 11 is a schematic diagram of another user holding manner according to an embodiment of this application.

For example, as shown in FIG. 11, in a walking process of the user, a right hand holds the mobile phone and swings back and forth. When the user picks up the mobile phone to prepare to light the screen, even if the mobile phone detects that a pressure operation of the user on the virtual power button meets the specified threshold, lighting of the screen is delayed, for example, the screen is lighted at a delay of 2 seconds. The mobile phone no longer lights the screen if an acceleration of the mobile phone exceeds the specified value again within 2s (for example, the right hand holds the mobile phone and swings back and forth again). A screen response time is increased to avoid a misoperation caused by an excessively large motion amplitude of the user in a motion process.

Scenario 6

In a possible design, in this embodiment of this application, whether proximity light of the mobile phone is blocked may be further determined based on data collected by a light sensor of the mobile phone. When the proximity light of the mobile phone is blocked, the mobile phone automatically increases a preset threshold of a touch parameter to a specified threshold, to reduce a probability of misoperations.

Figure 12A:
FIG. 12a and FIG. 12b are another schematic diagram in which proximity light of a mobile phone is blocked according to an embodiment of this application.
Figure 12B:
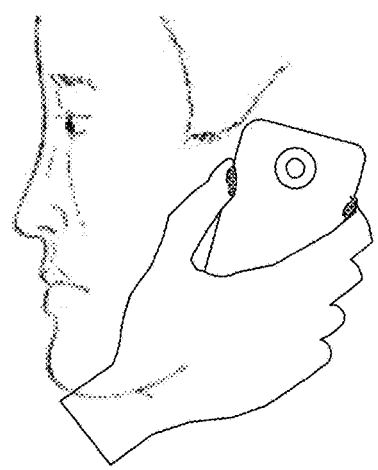

For example, as shown in FIG. 12a and FIG. 12b, when the mobile phone is placed in a handbag (or a trouser pocket), the proximity light is blocked, and the mobile phone is in a black screen state. In this case, to perform a misoperation, the mobile phone may automatically adjust the touch parameter of the curved screen in the side area to a maximum value. For another example, when the mobile phone currently displays a dialing interface, it indicates that the user is making a call. In this case, a finger of the user may exert acting force on the curved screen in the side area. Because the proximity light is also blocked by a face, the mobile phone automatically adjusts the response threshold of the touch parameter to a maximum value.

Figure 13:
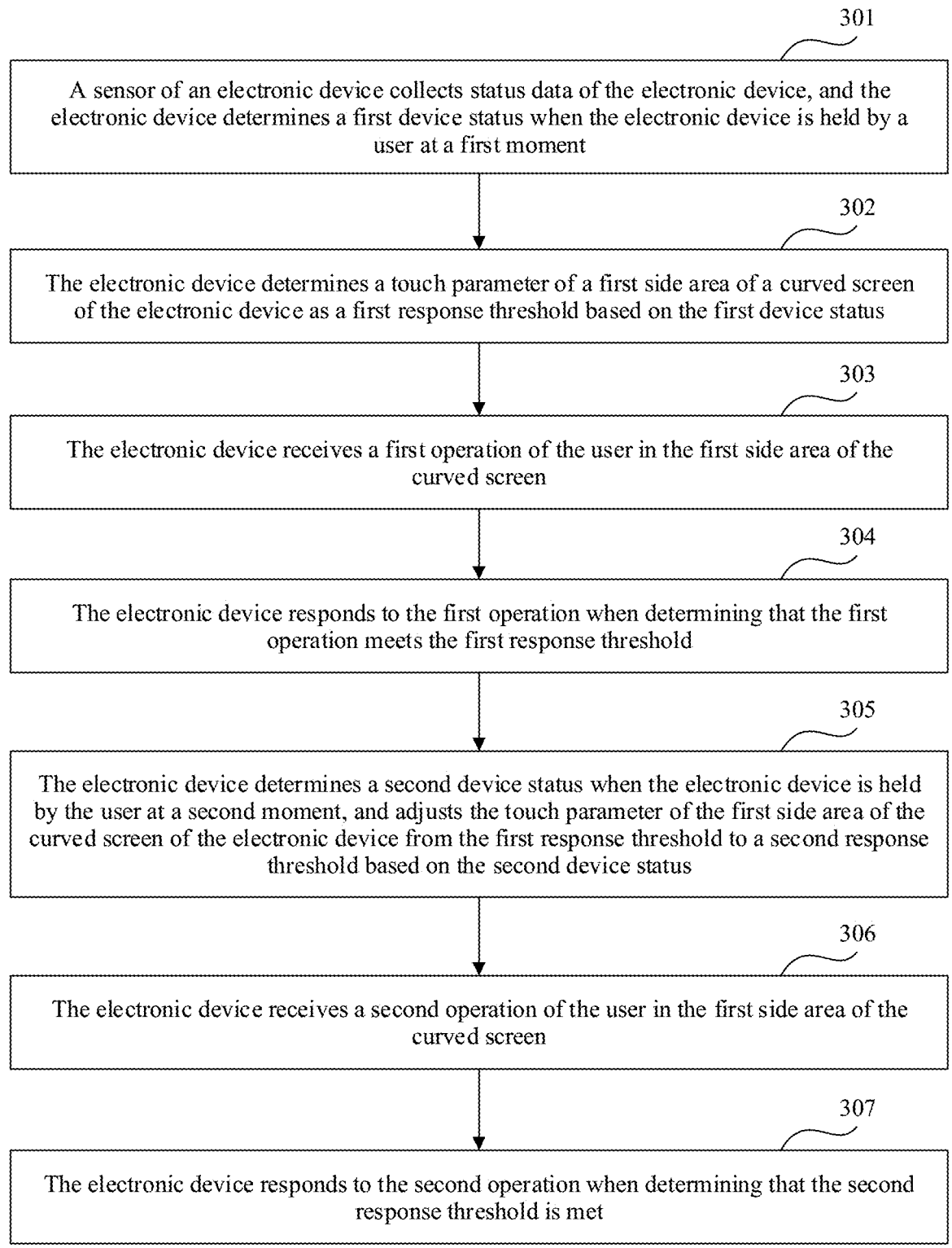
FIG. 13 is a schematic flowchart of a touchscreen response method according to an embodiment of this application.

FIG. 13 is an example of a procedure of a touchscreen response method according to an embodiment of this application. The method is performed by an electronic device.

Step 301: A sensor of the electronic device collects status data of the electronic device, and the electronic device determines a first device status when the electronic device is held by a user at a first moment.

Step 302: The electronic device determines a touch parameter of a first side area of a curved screen of the electronic device as a first response threshold based on the first device status.

A pressure sensor is disposed in the first side area of the curved screen of the electronic device.

Step 303: The electronic device receives a first operation of the user in the first side area of the curved screen.

The first operation may be a pressing operation, or may be a pressing and sliding operation.

Step 304: The electronic device responds to the first operation when determining that the first operation meets the first response threshold.

For example, when the first operation is a pressing operation, and the electronic device detects that the pressing operation is greater than first pressure, the electronic device responds to the first operation. For another example, when the first operation is a pressing and sliding operation, and the electronic device detects that the pressing operation is greater than first pressure and a sliding distance is greater than a first sliding distance, the electronic device responds to the first operation.

Step 305: The electronic device determines a second device status when the electronic device is held by the user at a second moment, and adjusts the touch parameter of the first side area of the curved screen of the electronic device from the first response threshold to a second response threshold based on the second device status.

A value of a first pressure threshold is different from a value of a second pressure threshold. The second device status is different from the first device status.

Step 306: The electronic device receives a second operation of the user in the first side area of the curved screen.

The second operation may be a pressing operation, or may be a pressing and sliding operation.

Step 307: The electronic device responds to the second operation when determining that the second response threshold is met.

For example, when the first operation is a pressing operation, and the electronic device detects that the pressing operation is greater than second pressure, the electronic device responds to the pressing operation. For another example, when the first operation is a pressing and sliding operation, and the electronic device detects that the pressing operation is greater than second pressure and a sliding distance is greater than a second sliding distance, the electronic device responds to the second operation.

In a possible design, when the touch parameter is pressure, for example, with reference to the case 1 and the case 2 in the scenario 1, a gravity sensor and a gyroscope of a mobile phone collect status data of the electronic device at the first moment, and the electronic device determines that an angle between a curved screen of the mobile phone and a horizontal plane is approximately 60 degrees. In this case, the mobile phone determines a response threshold of a pressure parameter of the curved screen in a side area of the mobile phone as a reference value based on a current included angle between the curved screen of the mobile phone and the horizontal plane and a portrait state of the mobile phone. The mobile phone responds only when a touch operation of the user on the curved screen in the side area meets the reference value. The gravity sensor and the gyroscope of the mobile phone collect status data of the electronic device at the second moment, and the electronic device determines that the angle between the curved screen of the mobile phone and the horizontal plane is approximately 90 degrees. Therefore, the response threshold of the pressure parameter of the curved screen in the side area of the mobile phone is determined as a sum of the reference value and a first threshold based on a current included angle between the curved screen of the mobile phone and the horizontal plane and the portrait state of the mobile phone. The mobile phone responds only when the touch operation of the user on the curved screen in the side area meets the sum of the reference value and the first threshold.

In a possible design, when the touch parameter is pressure and a sliding distance, for example, with reference to the case 1 and the case 2 in the scenario 1, a gravity sensor and a gyroscope of a mobile phone collect status data of the electronic device at the first moment, and the electronic device determines that an angle between a curved screen of the mobile phone and a horizontal plane is approximately 60 degrees. In this case, the mobile phone determines a response threshold of a sliding distance parameter of the curved screen in a side area of the mobile phone as a first reference value and a response threshold of a pressure parameter as a second reference value based on a current included angle between the curved screen of the mobile phone and the horizontal plane and a portrait state of the mobile phone. A sound volume is increased by one level when a sliding distance of a thumb of the user on the curved screen in the side area is greater than the first reference value and pressing pressure is greater than the second reference value. The gravity sensor and the gyroscope of the mobile phone collect status data of the electronic device at the second moment, and the electronic device determines that the angle between the curved screen of the mobile phone and the horizontal plane is approximately 90 degrees. Therefore, a preset threshold of the sliding distance parameter of the curved screen in the side area of the mobile phone is determined as a sum of the first reference value and a first threshold and the response threshold of the pressure parameter is determined as a sum of the second reference value and the first threshold based on a current included angle between the curved screen of the mobile phone and the horizontal plane and the portrait state of the mobile phone. The mobile phone responds only when the sliding distance of the thumb of the user on the curved screen in the side area is greater than the sum of the reference value and the first threshold and the pressing pressure is greater than the sum of the second reference value and the first threshold.

In a possible design, when the touch parameter includes pressure and an interface response time, the first response threshold includes first pressure and a first response time, the second response threshold includes second pressure and a second response time, and a first touch operation and a second touch operation are pressing operations. For example, with reference to the case 1 in the scenario 1 and the scenario 5, in the case 1 in the scenario 1, a mobile phone is in a still state, and the electronic device determines that an angle between a curved screen of the mobile phone and a horizontal plane is approximately 60 degrees. In this case, the mobile phone determines a response threshold of a pressure parameter of the curved screen in a side area of the mobile phone as a reference value based on a current included angle between the curved screen of the mobile phone and the horizontal plane and a portrait state of the mobile phone. The mobile phone immediately lights the screen when the mobile phone detects that a pressure operation of the user on a virtual power button is greater than the reference value. In the scenario 5, when the mobile phone is in a motion state, and an acceleration of the mobile phone is less than a specified value, the mobile phone lights the screen at a delay of 2 s even if the mobile phone detects that the pressure operation of the user on the virtual power button is greater than the reference value. The mobile phone no longer lights the screen if it is detected that the acceleration of the mobile phone exceeds the specified value again within 2 s (for example, a right hand holds the mobile phone and swings back and forth).

In a possible design, when the touch parameter includes pressure, a sliding distance, and an interface response time, the first response threshold includes first pressure, a first sliding distance, and a first response time, the second response threshold includes second pressure, a second sliding distance, and a second response time, and a first touch operation and a second touch operation are pressing and sliding operations. For example, with reference to the case 1 in the scenario 1 and the scenario 5, in the case 1 in the scenario 1, a mobile phone is in a still state, and the electronic device determines that an angle between a curved screen of the mobile phone and a horizontal plane is approximately 60 degrees. In this case, the mobile phone determines a response threshold of a pressure parameter of the curved screen in a side area of the mobile phone as a reference value based on a current included angle between the curved screen of the mobile phone and the horizontal plane and a portrait state of the mobile phone. The mobile phone immediately lights the screen when the mobile phone detects that a pressure operation of the user on a virtual volume button is greater than the reference value and a sliding distance is greater than the first sliding distance. In the scenario 5, when the mobile phone is in a motion state, and an acceleration of the mobile phone is less than a specified value, the mobile phone lights the screen at a delay of 2 s even if the mobile phone detects that the pressure operation of the user on the virtual volume button is greater than the reference value and a sliding distance is greater than the second sliding distance. The mobile phone no longer lights the screen if it is detected that the acceleration of the mobile phone exceeds the specified value again within 2s (for example, a right hand holds the mobile phone and swings back and forth).

Figure 14:
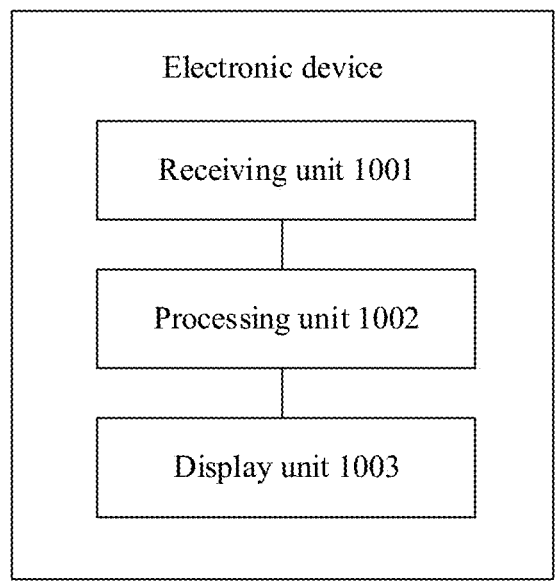
FIG. 14 is a schematic structural diagram of an electronic device according to an embodiment of this application.

In some embodiments of this application, an embodiment of this application discloses an electronic device. As shown in FIG. 14, the electronic device is configured to implement the method recorded in the foregoing method embodiment, and includes a receiving unit 1001, a processing unit 1002, and a display unit 1003. The receiving unit 1001 is configured to support the electronic device in performing the operation of receiving an operation of the user in the foregoing method. The processing unit 1002 is configured to: support the electronic device in adjusting a response threshold of a touch parameter based on a device status, and determine whether the operation of the user meets an adjusted response threshold of a touch operation. The display unit 1002 is configured to display a corresponding interaction interface when the operation of the user meets the adjusted response threshold of the touch operation. All related content in the foregoing method embodiment may be cited in function descriptions of a corresponding unit or module, and details are not described herein again.

Figure 15:
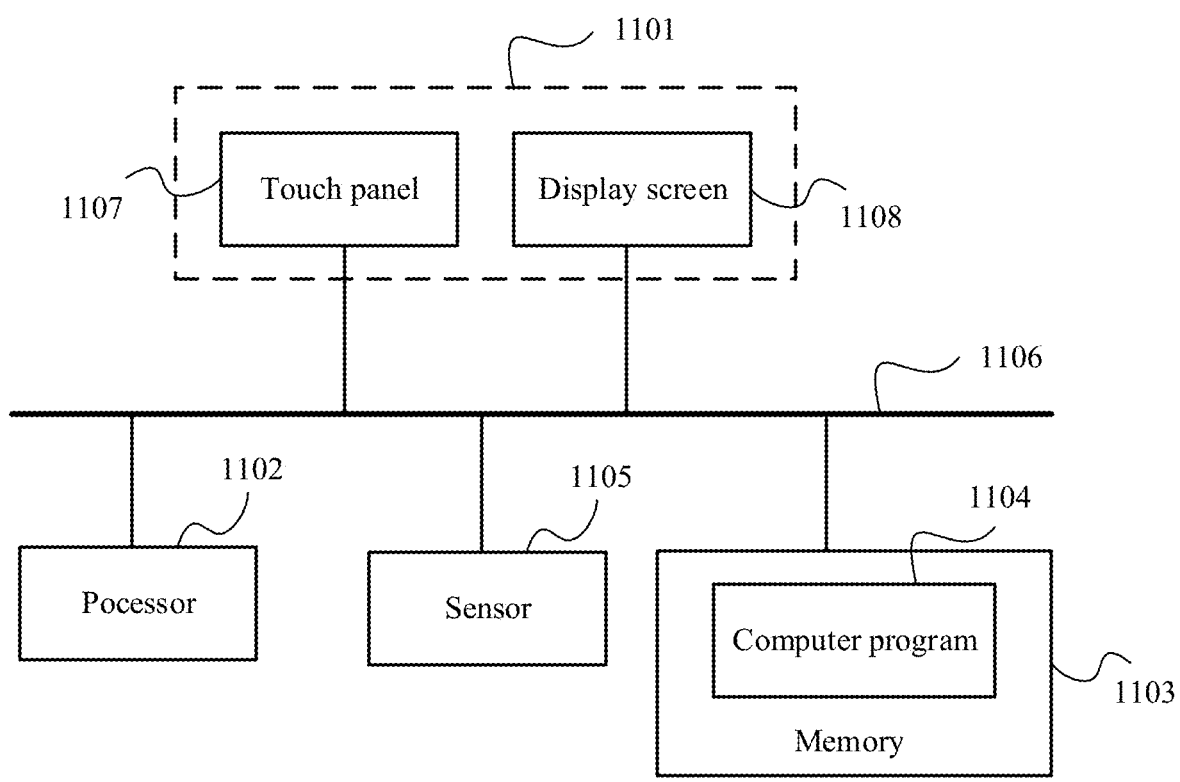
FIG. 15 is a schematic structural diagram of another electronic device according to an embodiment of this application.

In some other embodiments of this application, an embodiment of this application discloses an electronic device. As shown in FIG. 15, the electronic device may include: a curved screen 1101, where the curved screen 1101 includes a touch panel 1107 and a display screen 1108; one or more processors 1102; a memory 1103; one or more applications (not shown); one or more computer programs 1104; and a sensor 1105. The foregoing components may be connected by using one or more communications buses 1106. The one or more computer programs 1104 are stored in the memory 1103 and are configured to be executed by the one or more processors 1102. The one or more computer programs 1104 include an instruction, and the instruction may be used to perform the steps in the corresponding embodiments in FIG. 4a to FIG. 13.

An embodiment of this application further provides a computer storage medium. The computer storage medium stores a computer instruction. When the computer instruction is run on an electronic device, the electronic device is enabled to perform the related method steps to implement the touchscreen response method in the foregoing embodiment.

An embodiment of this application further provides a computer program product. When the computer program product runs on a computer, the computer is enabled to perform the related steps to implement the touchscreen response method in the foregoing embodiment.

In addition, an embodiment of this application further provides an apparatus. The apparatus may be specifically a chip, a component, or a module. The apparatus may include a processor and a memory that are connected, and the memory is configured to store a computer-executable instruction. When the apparatus runs, the processor may execute the computer-executable instruction stored in the memory, to enable the chip to perform the touchscreen response method in the foregoing method embodiment.

The electronic device, the computer storage medium, the computer program product, or the chip provided in the embodiments of this application is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division into the foregoing function modules is merely used as an example for illustration. During actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and there may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located at one place, or may be distributed in different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by an electronic device having a curved screen, the method comprises:
   determining a first device status when the electronic device is held by a user at a first moment, wherein determining the first device status at the first moment comprises determining a first angle between the curved screen and a horizontal plane;
   determining a first response threshold as a reference value based on the first angle when the electronic device is in a portrait state;
   determining a touch parameter of a first side area of the curved screen as the first response threshold based on the first device status, wherein a pressure sensor is disposed in the first side area;
   receiving a first operation of the user in the first side area;
   determining that the first operation meets or exceeds the first response threshold;
   responding to the first operation;
   determining a second device status when the electronic device is held by the user at a second moment after the first moment, wherein determining the second device status at the second moment comprises determining a second anile between the curved screen and the horizontal plane;
   determining a second response threshold as a sum of the reference value and a threshold value based on the second angle;
   adjusting the touch parameter from the first response threshold to the second response threshold based on the second device status, wherein a value of the first response threshold is different from a value of the second response threshold;
   receiving a second operation of the user in the first side area;
   determining that the second operation meets or exceeds the second response threshold; and
   responding to the second operation.

2. The method of claim 1, wherein when the touch parameter is a pressure parameter, the first operation and the second operation are pressing operations, the first response threshold is a first pressure value, and the second response threshold is a second pressure value.

3. The method of claim 1, wherein when the touch parameter comprises a pressure parameter and a sliding distance, the first operation and the second operation are pressing and sliding operations, the first response threshold comprises a first pressure value and a first sliding distance, and the second response threshold comprises a second pressure value and a second sliding distance.

4. The method of claim 1, wherein when the first device status is a still state, the second device status is a motion state, the touch parameter comprises a pressure parameter and an interface response time, the first response threshold is a first pressure value and a first response time, the second response threshold is a second pressure value and a second response time, the first response time is less than the second response time, and the first operation and the second operation are pressing operations.

5. The method of claim 1, wherein the first side area is an entire side or a part of a side of the curved screen.

6. The method of claim 1, further comprising:
   determining, based on first status data collected when the electronic device is held by the user at a third moment, that the electronic device is in the portrait state;
   determining, based on the portrait state, that a virtual volume button of the electronic device is located in a first touch operation area;
   determining that a third operation received by the curved screen acts on the first touch operation area; and
   responding when the third operation meets a specified condition.

7. The method of claim 6, further comprising:
   determining, based on second status data collected when the electronic device is held by the user at a fourth moment, that the electronic device is in a landscape state, wherein the fourth moment is after the third moment;
   adjusting, based on the landscape state, the virtual volume button of the electronic device from the first touch operation area to a second touch operation area, wherein a second location of the second touch operation area is different from a first location of the first touch operation area;
   determining that a fourth operation is received by the curved screen acts on the second touch operation area; and
   responding when the fourth operation meets a second specified condition.

8. The method of claim 7, further comprising displaying, on the curved screen, prompt information indicating a location of the virtual volume button in the second touch operation area.

9. The method of claim 7, further comprising:
   determining, based on third status data collected when the electronic device is held by the user at a fifth moment, that the electronic device is in the portrait state, wherein the fifth moment is after the fourth moment; and
   adjusting, based on the portrait state, the virtual volume button of the electronic device from the second touch operation area to the first touch operation area.

10. An electronic device comprising:
    a curved screen configured to receive a first operation and a second operation of the user user;
    a gyroscope sensor;
    a gravity sensor, wherein the gyroscope sensor and the gravity sensor are collectively configured to:
      collect first status data of the electronic device at a first moment when the electronic device is held by the user; and
      collect second status data of the electronic device at a second moment when the electronic device is held by the user, wherein the second moment is after the first moment;
    a pressure sensor disposed in a first side area of the curved screen;
    a memory configured to store a computer-readable program;

a processor coupled to the memory, wherein the computer-readable program is executed by the processor to cause the processor to:
- determine, based on the first status data, a first device status;
- determine a touch parameter of the first side area as a first response threshold based on the first device status;
- determine that the first operation meets or exceeds the first response threshold;
- respond to the first operation;
- determine, based on the second status data, a second device status;
- adjust the touch parameter from the first response threshold to a second response threshold based on the second device status, wherein a value of the first response threshold is different from a value of the second response threshold;
- determine that the second operation meets or exceeds the second response threshold; and
- respond to the second operation, wherein when the first device status is a still state, the second device status is a motion state, the touch parameter comprises a pressure parameter and an interface response time the first response threshold is a first pressure value and a first response time, the second response threshold is a second pressure parameter and a second response time, the first response time is less than the second response time, and the first operation and the second operation are pressing operations.

11. The electronic device of claim 10, wherein when the touch parameter is a pressure parameter, the first operation and the second operation are pressing operations, the first response threshold is a first pressure value, and the second response threshold is a second pressure value.

12. The electronic device of claim 10, wherein when the touch parameter comprises a pressure parameter and a sliding distance, the first operation and the second operation are pressing and sliding operations, the first response threshold is a first pressure value and a first sliding distance, and the second response threshold is a second pressure value and a second sliding distance.

13. The electronic device of claim 10, wherein the first side area is an entire side or a part of a side of the curved screen.

14. The electronic device of claim 10, wherein the computer-readable program is further executed by the processor to cause the processor to be configured to:
- determine, based on third status data collected when the electronic device is held by the user at a third moment, that the electronic device is in a portrait state;
- determine, based on the portrait state, that a virtual volume button of the electronic device is located in a first touch operation area;
- determine that a third operation received by the curved screen acts on the first touch operation area; and
- respond when the third operation meets a specified condition;
- determine, based on fourth status data collected when the electronic device is held by the user at a fourth moment, that the electronic device is in a landscape state, wherein the fourth moment is after the third moment;
- adjust, based on the landscape state, the virtual volume button of the electronic device from the first touch operation area to a second touch operation area, wherein a second location of the second touch operation area is different from a first location of the first touch operation area;
- determine that a fourth operation is received by the curved screen acts on the second touch operation area; and
- respond when the fourth operation meets a second specified condition.

15. The electronic device of claim 10, wherein the computer-readable program is further executed by the processor to cause the processor to be configured to:
- determine a first angle between the curved screen and a horizontal plane;
- determine the first response threshold as a reference value based on the first angle when the electronic device is in a portrait state;
- determine a second angle between the curved screen and the horizontal plane; and
- determine the second response threshold as a sum of the reference value and a threshold value based on the second angle.

* * * * *

UNITED STATES PATENT AND TRADEMARK OFFICE
CERTIFICATE OF CORRECTION

PATENT NO. : 11,553,078 B2
APPLICATION NO. : 17/312791
DATED : January 10, 2023
INVENTOR(S) : Jie Xu It is certified that error appears in the above-identified patent and that said Letters Patent is hereby corrected as shown below:

In the Claims

Claim 1, Column 31, Line 38: "second anile between" should read "second angle between"

Signed and Sealed this
Seventh Day of March, 2023

Katherine Kelly Vidal
Director of the United States Patent and Trademark Office